(12) United States Patent
Kishi et al.

(10) Patent No.: US 11,979,669 B2
(45) Date of Patent: May 7, 2024

(54) CLEANING DEVICE, IMAGING UNIT INCLUDING THE SAME, AND CLEANING METHOD

(71) Applicant: Murata Manufacturing Co., Ltd., Nagaokakyo (JP)

(72) Inventors: Noritaka Kishi, Nagaokakyo (JP); Hitoshi Sakaguchi, Nagaokakyo (JP); Masaaki Takata, Nagaokakyo (JP); Masaru Amano, Nagaokakyo (JP); Takaaki Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 804 days.

(21) Appl. No.: 17/108,034

(22) Filed: Dec. 1, 2020

(65) Prior Publication Data

US 2021/0084199 A1  Mar. 18, 2021

Related U.S. Application Data

(63) Continuation of application No. PCT/JP2020/000851, filed on Jan. 14, 2020.

(30) Foreign Application Priority Data

Apr. 26, 2019  (JP) .................................. 2019-086243

(51) Int. Cl.
*H04N 5/217* (2011.01)
*B08B 3/12* (2006.01)
(Continued)

(52) U.S. Cl.
CPC ............. *H04N 23/811* (2023.01); *B08B 3/12* (2013.01); *B08B 7/0028* (2013.01); *G02B 27/0006* (2013.01); *B08B 3/041* (2013.01)

(58) Field of Classification Search
CPC ........ H04N 23/811; H04N 23/52; B08B 3/12; B08B 7/0028; B08B 3/041; B08B 7/028;
(Continued)

(56) References Cited

U.S. PATENT DOCUMENTS 11,002,954 B2 *  5/2021  Kuratani ............ G02B 27/0006
11,467,396 B2 * 10/2022  Kuratani ............ G02B 27/0006
(Continued)

FOREIGN PATENT DOCUMENTS

CN    101334577 A    12/2008
JP    2003-330082 A  11/2003
(Continued)

OTHER PUBLICATIONS

Official Communication issued in International Patent Application No. PCT/JP2020/000851, mailed on Mar. 24, 2020.
(Continued)

*Primary Examiner* — Alexander Markoff
(74) *Attorney, Agent, or Firm* — Keating & Bennett, LLP

(57) ABSTRACT

In a cleaning device, a signal processing circuit determines that a foreign substance has adhered to a surface of a protection cover based on at least two pieces of information among a change amount of a resonant frequency when a vibration portion is driven at a first voltage, a change amount of a current value relating to an impedance detected by an impedance detector, and a temporal change of an image captured by an imaging portion, and cleans the surface of the protection cover by controlling the vibration portion in accordance with the determination.

17 Claims, 14 Drawing Sheets

(51) Int. Cl.
 *B08B 7/00* (2006.01)
 *G02B 27/00* (2006.01)
 *H04N 23/81* (2023.01)
 *B08B 3/04* (2006.01)

(58) Field of Classification Search
 CPC ......... B08B 7/02; G02B 27/0006; B60S 1/52; B60S 1/56; B60S 1/60; G03B 15/00; G03B 17/02
 See application file for complete search history.

(56) References Cited

U.S. PATENT DOCUMENTS

| | | | |
|---|---|---|---|
| 2004/0047625 | A1 | 3/2004 | Ito et al. |
| 2009/0002541 | A1 | 1/2009 | Niwamae |
| 2011/0073142 | A1* | 3/2011 | Hattori .................. B60S 1/52 134/198 |
| 2012/0057066 | A1* | 3/2012 | Kawai .................... B08B 7/02 348/340 |
| 2012/0243093 | A1* | 9/2012 | Tonar .................. H10N 30/20 359/507 |
| 2014/0299748 | A1* | 10/2014 | Koops .................... B60S 1/56 250/216 |
| 2015/0040953 | A1* | 2/2015 | Kikuta .................... B60S 1/56 134/123 |
| 2016/0266379 | A1* | 9/2016 | Li ........................... B08B 7/028 |
| 2017/0036647 | A1* | 2/2017 | Zhao ................. G02B 27/0006 |
| 2018/0095272 | A1* | 4/2018 | Fujimoto ............... G03B 17/56 |
| 2018/0141521 | A1 | 5/2018 | Irie et al. |
| 2018/0239218 | A1 | 8/2018 | Ikeuchi et al. |
| 2018/0246323 | A1* | 8/2018 | Fedigan .................. B08B 7/02 |
| 2020/0039475 | A1* | 2/2020 | Ichiguchi ............... H04N 23/52 |
| 2020/0057301 | A1* | 2/2020 | Kuratani ................ G03B 17/08 |
| 2020/0174287 | A1* | 6/2020 | Lam ....................... G02B 1/002 |
| 2021/0063729 | A1* | 3/2021 | Shimizu ................. G03B 17/55 |
| 2021/0084199 | A1* | 3/2021 | Kishi .................. G02B 27/0006 |
| 2021/0132372 | A1* | 5/2021 | Kuratani ............ G02B 27/0006 |
| 2021/0370358 | A1* | 12/2021 | Mori ........................ B08B 3/12 |

FOREIGN PATENT DOCUMENTS

| | | |
|---|---|---|
| JP | 2004-289532 A | 10/2004 |
| JP | 2009-010736 A | 1/2009 |
| JP | 2009-165032 A | 7/2009 |
| JP | 2011180757 A | 9/2011 |
| JP | 2011-244417 A | 12/2011 |
| JP | 2012-138768 A | 7/2012 |
| JP | 2015-031564 A | 2/2015 |
| WO | 2018/198465 A1 | 11/2018 |

OTHER PUBLICATIONS

First Office Action in CN202080007622.0, mailed Nov. 3, 2022, 14 pages.

* cited by examiner

FIRST
VIBRATION MODE
(RESONANT
FREQUENCY f1)

SECOND
VIBRATION MODE
(RESONANT
FREQUENCY f2)

THIRD
VIBRATION MODE
(RESONANT
FREQUENCY f3)

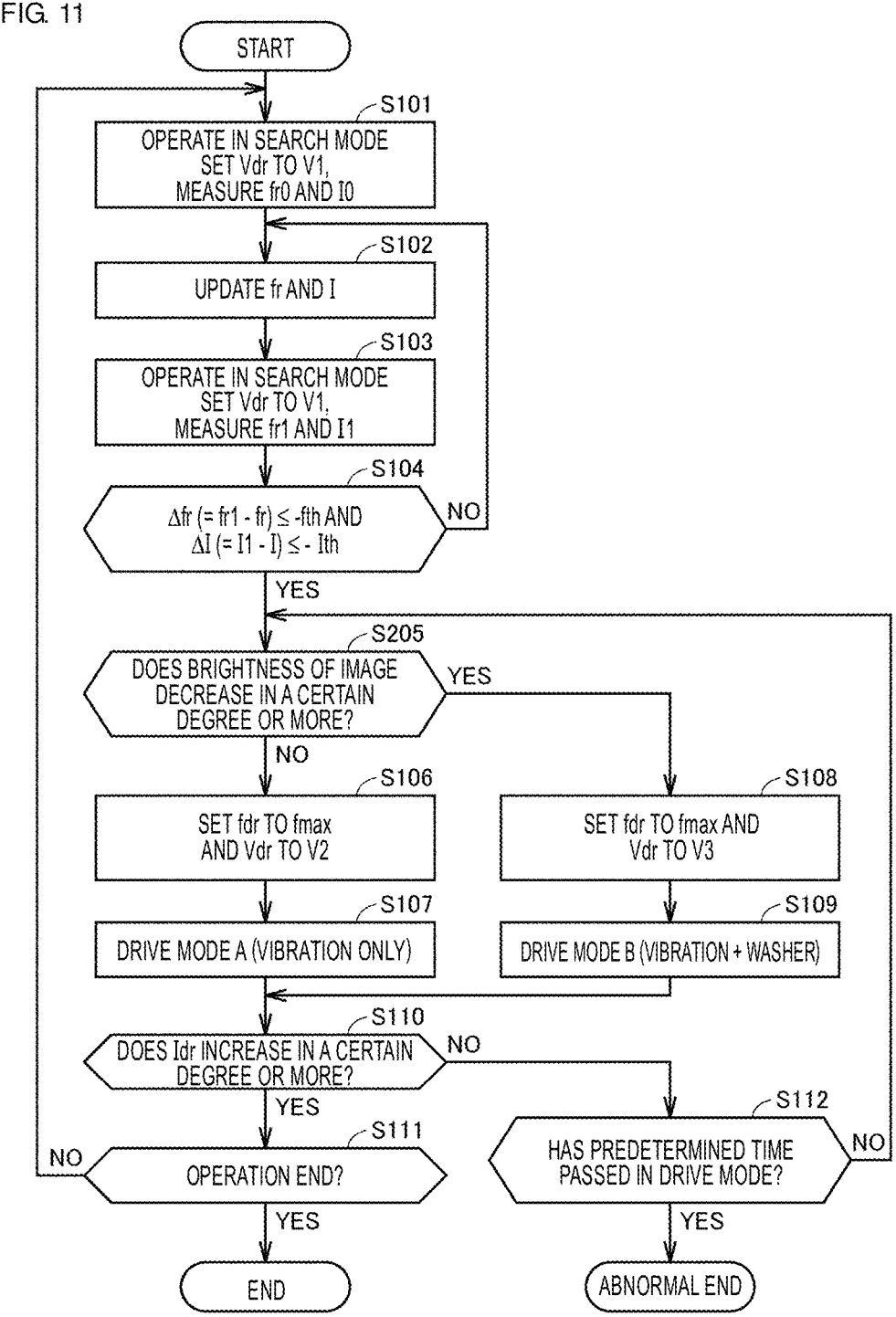

CLEANING DEVICE, IMAGING UNIT INCLUDING THE SAME, AND CLEANING METHOD

CROSS REFERENCE TO RELATED APPLICATIONS

This application claims the benefit of priority to Japanese Patent Application No. 2019-086243 filed on Apr. 26, 2019 and is a Continuation Application of PCT Application No. PCT/JP2020/000851 filed on Jan. 14, 2020. The entire contents of each application are hereby incorporated herein by reference.

BACKGROUND OF THE INVENTION

1. Field of the Invention

The present invention relates to a cleaning device, an imaging unit including the same, and a cleaning method.

2. Description of the Related Art

By providing an imaging unit in a front or a rear portion of a vehicle and using an image captured by the imaging unit, a safety device is controlled or automatic drive control is performed, for example. Such an imaging unit is often provided outside a vehicle, and thus, foreign substances such as raindrops, mud, and dust may adhere to a light-transmissive body (lens or protective glass, for example) that covers the outside portion thereof. When a foreign substance has adhered to the light-transmissive body, the adhering foreign substance is captured in an image captured by the imaging unit, and a sharp image may not be obtained.

Therefore, a cleaning device that identifies the foreign substance adhering to a surface of the light-transmissive body and vibrates the light-transmissive body to remove the foreign substance has been developed (Japanese Unexamined Patent Application Publication No. 2012-138768). Further, a cleaning device that discharges a cleaning liquid onto the surface of the light-transmissive body and vibrates the light-transmissive body to remove the foreign substance has been developed (Japanese Unexamined Patent Application Publication No. 2011-244417).

However, the cleaning device described in Japanese Unexamined Patent Application Publication No. 2012-138768 may not be able to remove muddy water, for example, by only vibrating the light-transmissive body. For example, vibrating the light-transmissive body may lead to atomization of the moisture in muddy water, and the concentration of mud in the muddy water may increase. Thus, it may not be possible to remove, for example, muddy water by only vibrating the light-transmissive body.

The cleaning device described in Japanese Unexamined Patent Application Publication No. 2011-244417 may remove the foreign substance on the light-transmissive body by combining vibration of the light-transmissive body and discharge of a cleaning liquid. However, in actual driving, almost only raindrops adhere to the light-transmissive body of the imaging unit as a foreign substance, and mud rarely adheres thereto. Meanwhile, the cleaning device described in Japanese Unexamined Patent Application Publication No. 2011-244417 discharges the cleaning liquid even when a water droplet or a minute amount of mud has adhered as the foreign substance to the light-transmissive body, and this increases cleaning liquid consumption and reduces cleaning efficiency.

SUMMARY OF THE INVENTION

Preferred embodiments of the present invention provide cleaning devices, imaging units including the cleaning devices, and cleaning methods, each capable of cleaning with high efficiency a foreign substance adhering to a light-transmissive body.

A cleaning device according to a preferred embodiment of the present invention includes a holding portion to hold an imaging element, a light-transmissive body disposed in a field of view of the imaging element, a vibrator to vibrate the light-transmissive body, a driver to drive the vibrator, a controller to control the driver, and a detector to detect a value relating to the impedance of the vibrator driven by the driver. The controller determines that a foreign substance has adhered to the surface of the light-transmissive body based on at least two pieces of information among a temporal change in resonant frequency when the vibrator is driven at a first voltage, a temporal change in the value relating to the impedance detected by the detector, and a temporal change in an image captured by the imaging element. The controller cleans the surface of the light-transmissive body by controlling the vibrator in accordance with the determination.

An imaging unit according to a preferred embodiment of the present invention includes the cleaning device described above.

A cleaning method according to a preferred embodiment of the present invention is a cleaning method for cleaning a surface of a light-transmissive body by using a cleaning device including a holding portion to hold an imaging element, a light-transmissive body to be disposed in a field of view of the imaging element, a vibrator to vibrate the light-transmissive body, a driver to drive the vibrator, a controller to control the driver, and a detector to detect a value relating to the impedance of the vibrator driven by the driver. The cleaning method includes steps of driving the vibrator at a first voltage as a search mode, determining that a foreign substance has adhered to the surface of the light-transmissive body based on at least two pieces of information among a temporal change in resonant frequency, a temporal change in a value relating to the impedance detected by the detector, and a temporal change in an image captured by the imaging element in the search mode, determining a drive frequency to drive the vibrator in accordance with the determination that a foreign substance has adhered to the surface of the light-transmissive body, and to drive the vibrator at the determined drive frequency and a second voltage as a drive mode.

According to preferred embodiments of the present invention, the controller is able to determine that the foreign substance has adhered to the surface of the light-transmissive body based on at least two pieces of information, and cleaning with high efficiency is performed to clean the foreign substance adhering to the light-transmissive body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a flowchart for describing an operation of a cleaning device for an imaging unit according to Modification of Preferred Embodiment 1 of the present invention.

DETAILED DESCRIPTION OF THE PREFERRED EMBODIMENTS

Figure 1:
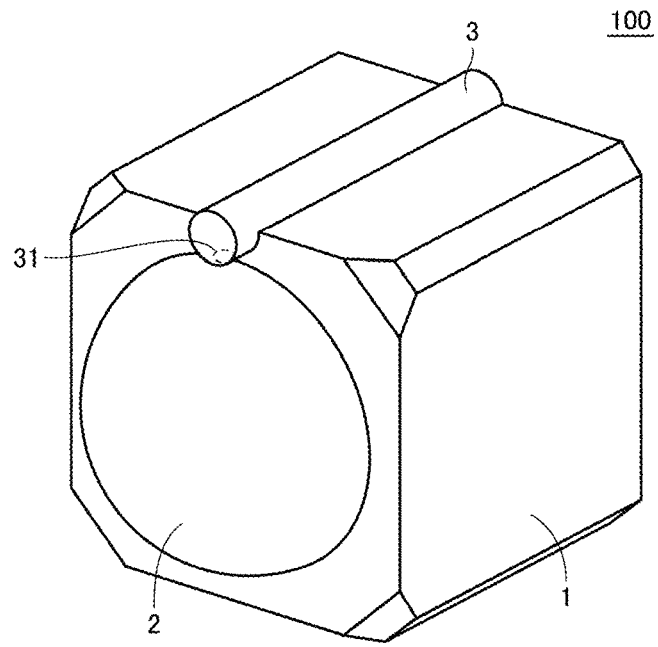
FIG. 1 is a perspective view of an imaging unit according to Preferred Embodiment 1 of the present invention.

Hereinafter, imaging units according to preferred embodiments of the present invention will be described in detail with reference to the drawings. Note that the same reference numerals in the drawings denote the same or corresponding portions.

Preferred Embodiment 1

Figure 2:
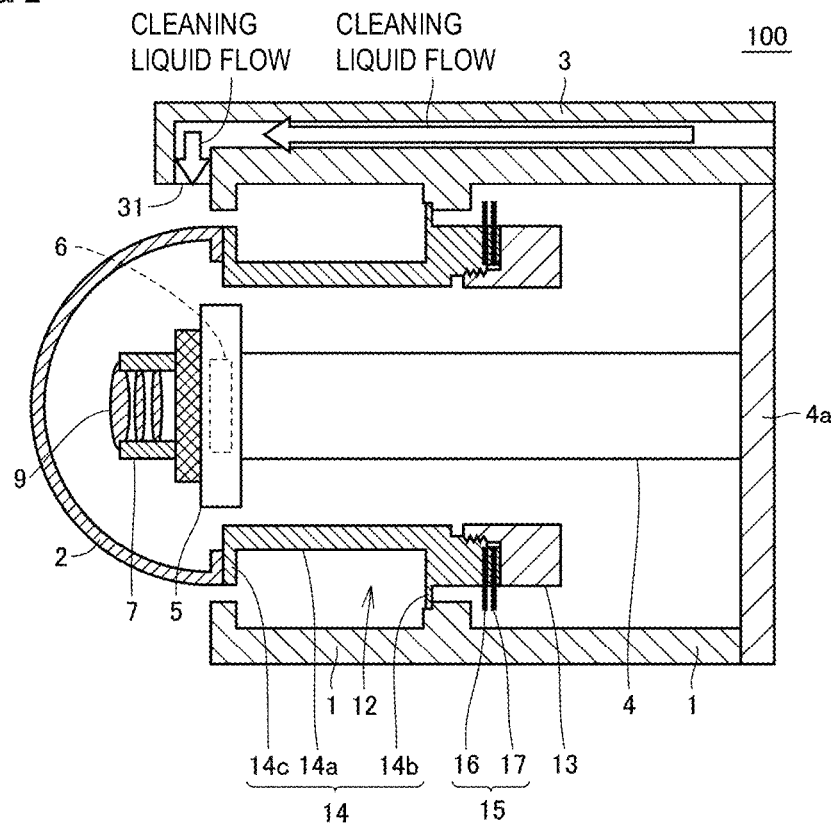
FIG. 2 is a sectional view of the imaging unit according to Preferred Embodiment 1 of the present invention.

Hereinafter, an imaging unit according to Preferred Embodiment 1 will be described with reference to the drawings. FIG. 1 is a perspective view of an imaging unit 100 according to Preferred Embodiment 1. FIG. 2 is a sectional view of the imaging unit 100 according to Preferred Embodiment 1. The imaging unit 100 includes a housing 1, a protection cover 2 that is transparent and provided on one side of the housing 1, a cleaning nozzle 3 including an opening 31 to discharge a cleaning liquid (cleaning body) onto the protection cover 2, a vibration portion 12 as a vibrator to vibrate the protection cover 2, and an imaging portion provided inside the protection cover 2. Note that the configuration of the housing 1, the protection cover 2, the cleaning nozzle 3, and the vibration portion 12, excluding the imaging portion 5 from the imaging unit 100, defines a cleaning device to clean an adhering foreign substance (adhering substance) within an imaging range of the imaging portion 5.

The imaging portion 5 is supported by a main body member 4, which is tubular, and is fixed to a base plate 4a as illustrated in FIG. 2. The base plate 4a is fixed to a portion of the housing 1. The housing 1 defines and functions as a holding portion that holds the imaging portion 5 via the main body member 4 and the base plate 4a. Note that any structure capable of holding the imaging portion 5 including the structure illustrated in FIG. 2 may be employed for the holding portion.

A circuit 6 including an imaging element is included in the imaging portion 5. A lens module 7 is fixed in an imaging direction of the imaging portion 5. The lens module 7 includes a tubular body, and a plurality of lenses 9 is provided therein. Note that any structure capable of capturing an image of an object to be imaged that is located in front of the lenses 9 may be used as the structure of the imaging portion 5.

The housing 1 preferably has a rectangular or substantially rectangular tube shape and is made of metal or synthetic resin, for example. Note that the housing 1 may have another shape, such as a tubular shape, for example. The base plate 4a is fixed to one end side of the housing 1, and the protection cover 2 and the vibration portion 12 are provided on the other end side of the housing 1.

The vibration portion 12 has a tubular shape. The vibration portion 12 includes a first tubular member 13 having a tubular shape, a second tubular member 14 having a tubular shape, and a piezoelectric vibrator 15 having a tubular shape. The piezoelectric vibrator 15 having a tubular shape includes two piezoelectric plates 16 and 17 having a tubular shape. In the thickness direction of the two piezoelectric plates 16 and 17, the polarization direction of one piezoelectric plate and the polarization direction of the other piezoelectric plate are opposite to each other.

Note that in preferred embodiments of the present invention, the vibration portion and the piezoelectric vibrator may have, for example, a rectangular or substantially rectangular tube shape in addition to a tubular shape. A tubular shape, that is, a ring shape is preferably used.

The piezoelectric plates 16 and 17 are preferably made of, for example, a lead zirconate titanate (PZT)-based piezoelectric ceramic. In addition, other piezoelectric ceramics, such as $KNbO_3$ or $NaNbO_3$, for example, may be used. Further, a piezoelectric single crystal, such as $LiTaO_3$, for example, may be used.

Electrodes (not illustrated) are provided on both surfaces of the piezoelectric plates 16 and 17. The electrode preferably has a laminated structure of Ag, NiCu, and NiCr, for example.

The first tubular member 13 with a tubular shape is fixed to the lower surface of the piezoelectric vibrator 15. The first tubular member 13 is made of metal. As the metal, a metal such as, for example, duralumin, stainless steel, or Kovar may preferably be used. The first tubular member 13 may be made of a semiconductor having conductivity, such as Si, for example.

The piezoelectric vibrator 15 is sandwiched between a portion of the first tubular member 13 and a portion of the second tubular member 14. Each of the first tubular member 13 and the second tubular member 14 is made of metal and has electrical conductivity. Applying an AC electric field to each electrode of the piezoelectric plates 16 and 17 may vibrate the piezoelectric vibrator 15 in a longitudinal direction or in a lateral direction. A female screw portion is provided on an inner circumferential surface of a portion of the second tubular member 14. With the female screw portion, the first tubular member 13 is screwed into the second tubular member 14, and the first tubular member 13 is fixed to the second tubular member 14. With this screwing, a portion of the first tubular member 13 and a portion of the second tubular member 14 are brought into pressure contact with the upper surface and the lower surface of the piezoelectric vibrator 15.

Therefore, the entire vibration portion 12 vibrates efficiently because of the vibration generated in the piezoelectric vibrator 15. In the present preferred embodiment, the vibration portion 12 is efficiently excited by a longitudinal effect or a lateral effect.

Meanwhile, the second tubular member 14 includes a flange portion 14b protruding outward. The flange portion 14b is disposed in and fixed to the recess of the housing 1.

At an end of the second tubular member 14, a flange portion 14c protruding outward is provided. A portion defining a connection between the flange portion 14b and the flange portion 14c is a thin portion 14a. The thickness of the thin portion 14a is less than the thickness of the first tubular member 13. Therefore, the thin portion 14a having a tubular shape is largely displaced by the vibration of the vibration portion 12. The presence of the thin portion 14a may cause the vibration, in particular, the amplitude thereof, to increase.

The protection cover 2 is fixed to the flange portion 14c. The protection cover 2 defines and functions as a light-transmissive body that transmits light from an object to be imaged. The protection cover 2 includes an opening that opens in one direction. An end of the opening is bonded to the flange portion 14c. This bonding is achieved by an adhesive or a brazing material, for example. Further, thermo-pressure bonding or anodic bonding, for example, may be used.

The protection cover 2 has a dome shape extending from the end bonded to the flange portion 14c. In the present preferred embodiment, the dome shape is a hemispherical shape, for example. The imaging portion 5 has a viewing angle of, for example, about 170°. The dome shape is not limited to a hemispherical shape. For example, a shape in which the cylinders are joined to a hemisphere or a curved surface shape smaller than a hemisphere may be used. The entire protection cover 2 has a light transmissive property. In the present preferred embodiment, the protection cover 2 is preferably made of glass, for example. However, the protection cover 2 may be made of, for example, transparent plastic instead of glass. Alternatively, the protection cover 2 may be made of a light transmissive ceramic material, for example. It is preferable to use tempered glass, depending on the application. Thereby, the strength may be increased. Further, when glass is used, a coating layer made of, for example, DLC may preferably be provided on the surface to increase the strength.

The lens module 7 and the imaging portion 5 described above are disposed inside the protection cover 2. An object to be imaged outside is captured through the protection cover 2.

The housing 1 is provided with the cleaning nozzle 3 including the opening 31 to discharge the cleaning liquid onto the protection cover 2. The cleaning nozzle 3 has a tubular shape and is supplied with the cleaning liquid from the end portion provided on a side opposite to a side of the opening 31. The cleaning nozzle 3 discharges the cleaning liquid from the opening 31 to the end of the protection cover 2. The front end of the cleaning nozzle 3 is outside the imaging range (field of view) of the imaging portion 5, and the opening 31 is not located at a position where the imaging portion 5 captures an image. In FIG. 2, flow of cleaning liquid is indicated by arrows. The cleaning nozzle 3 defines and functions as a discharger to discharge the cleaning liquid. In the present preferred embodiment, a configuration in which one cleaning nozzle 3 is provided in the housing 1 is illustrated. However, a configuration in which a plurality of cleaning nozzles 3 are provided in the housing 1 may be used.

In the present preferred embodiment, a description will be provided of the cleaning device provided to the imaging unit 100 (hereinafter simply referred to as the cleaning device) including the cleaning nozzle 3 and being configured to be able to discharge the cleaning liquid onto the protection cover 2 to clean. However, the cleaning device is not limited to including the cleaning nozzle 3 and may be configured to clean only by vibrating the protection cover 2. The cleaning device may include another component (for example, an air blower) in addition to or instead of the cleaning nozzle 3.

Figure 3:
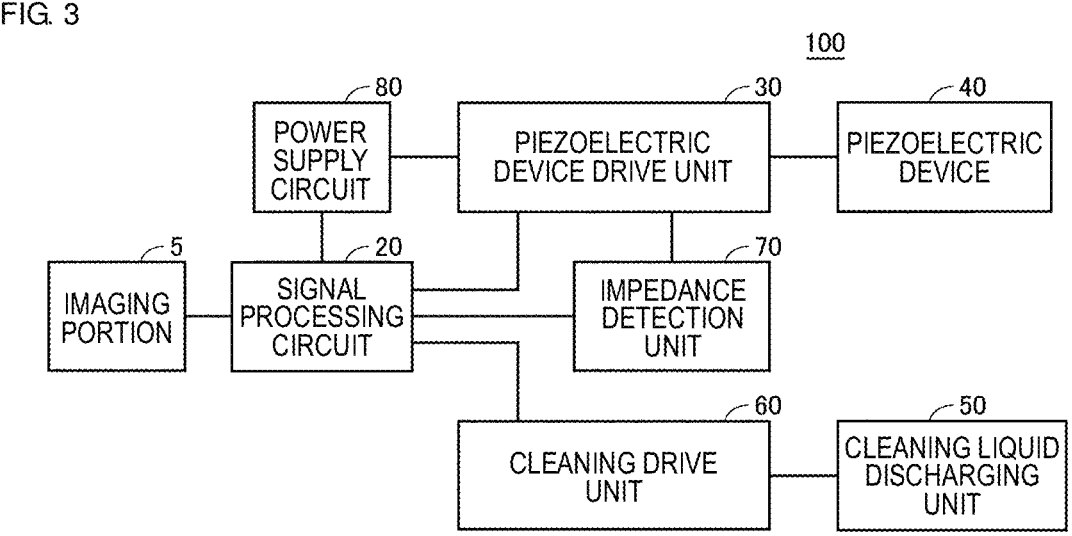
FIG. 3 is a block diagram for describing control of a cleaning device for the imaging unit according to Preferred Embodiment 1 of the present invention.

Next, the control of the cleaning device will be described with reference to the drawings. FIG. 3 is a block diagram for describing the control of the cleaning device for the imaging unit 100 according to Preferred Embodiment 1.

The imaging unit 100 includes the imaging portion 5, a signal processing circuit 20, a piezoelectric device driver 30, a piezoelectric device 40, a cleaning liquid discharger 50, a cleaning driver 60, an impedance detector 70, and a power supply circuit 80. The signal processing circuit 20 is a controller that processes an imaging signal from the imaging portion 5 and supplies a control signal to the piezoelectric device driver 30 and the cleaning driver 60. The cleaning liquid discharger 50, which has a configuration to discharge the cleaning liquid from the opening 31 of the cleaning nozzle 3, is illustrated as one block.

The signal processing circuit 20 is provided with, for example, a central processing unit (CPU) defining and functioning as a control center, a read-only memory (ROM) storing a program for the CPU to operate, control data, or the like, a random access memory (RAM) defining and functioning as a work area of the CPU, and an input/output interface to maintain the consistency of signals with peripheral devices.

The piezoelectric device driver 30 generates an AC output signal of a frequency f and a voltage V in accordance with the control signal and a drive voltage from the signal processing circuit 20. The piezoelectric device 40 is defined by the vibration portion 12 including the piezoelectric vibrator 15 illustrated in FIG. 2. Applying an AC output signal to the piezoelectric vibrator 15 causes the vibration portion 12 and the protection cover 2 to vibrate to remove the foreign substance.

In addition, the signal processing circuit 20 is able to generate a control signal to discharge the cleaning liquid onto the protection cover 2 and to clean. The cleaning driver 60 controls the discharge of the cleaning liquid, from the cleaning liquid discharger 50 onto the protection cover 2, based on the control signal from the signal processing circuit 20.

The impedance detector 70 monitors the current of the piezoelectric device driver 30 while the piezoelectric device 40 is operated by applying the AC output signal to the piezoelectric vibrator 15.

Figure 4:
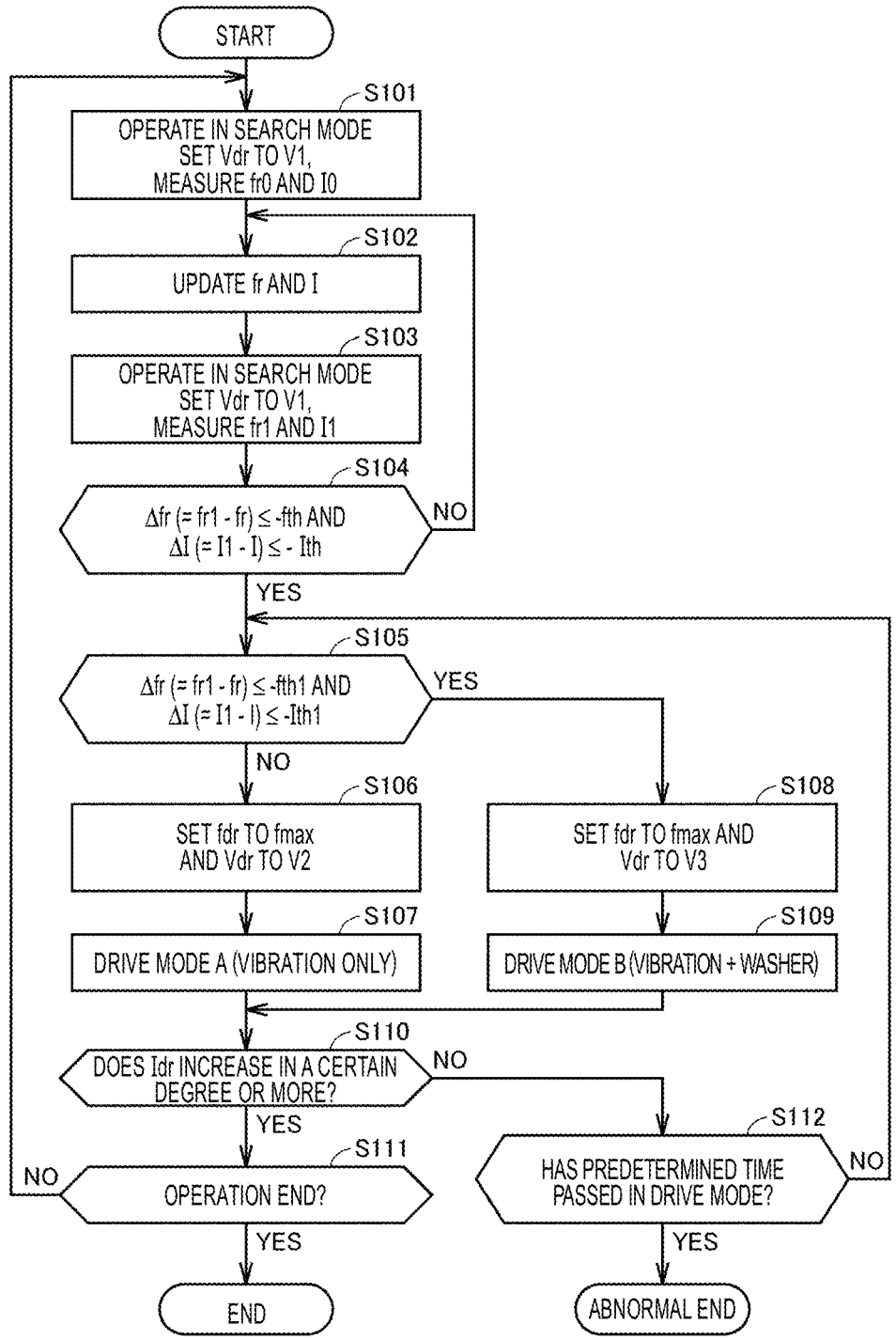
FIG. 4 is a flowchart for describing an operation of the cleaning device for the imaging unit according to Preferred Embodiment 1 of the present invention.

Next, operation of the cleaning device for the imaging unit will be described based on a flowchart. FIG. 4 is a flowchart for describing operation of the cleaning device for the imaging unit according to Preferred Embodiment 1. First, the signal processing circuit 20 causes the piezoelectric device 40 to operate in a search mode and determines that a foreign substance has adhered to the surface of the protection cover 2. The piezoelectric device driver 30 applies an AC output signal to the piezoelectric vibrator 15 by setting the drive voltage Vdr to V1 and sweeping the frequency f to operate the piezoelectric device 40 in the search mode. It is preferable that the drive voltage Vdr of the AC output signal applied to the piezoelectric vibrator 15 is smaller from the viewpoint of reducing or preventing heat generation.

The impedance detector 70 monitors the current of the piezoelectric device driver 30 while the piezoelectric device 40 is operated in the search mode. Specifically, the impedance detector 70 measures the frequency, within the sweeping frequency range f, at which the current of the piezoelectric device driver 30 becomes maximum (or impedance, being the inverse of current value, becomes minimum) as the initial resonant frequency fr0 and measures the current value at this time as I0 (step S101). The signal processing circuit 20 updates reference values f and I with the measured initial resonant frequency fr0 and the current value I0 (step S102).

Figure 5:
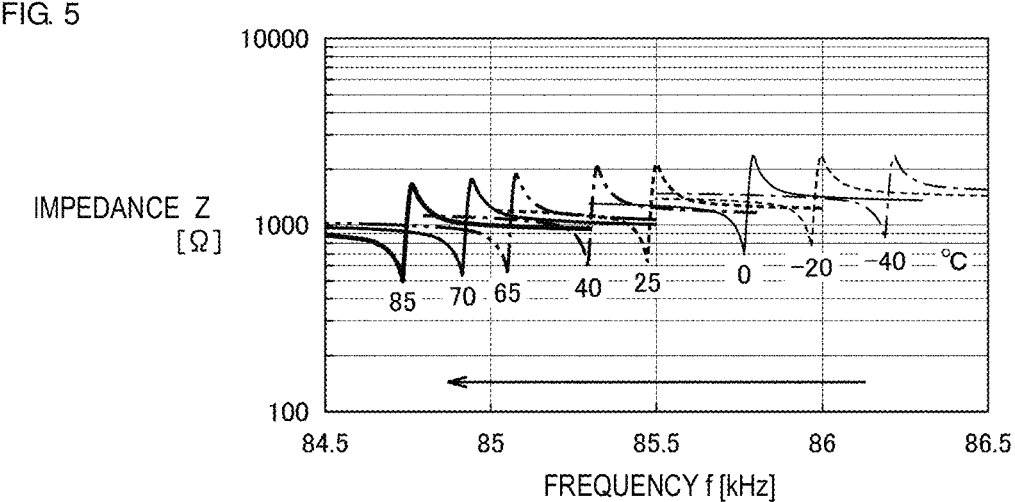
FIG. 5 is a graph showing a relationship between a resonant frequency of a piezoelectric device and a temperature.

Here, the relationship between the resonant frequency of the piezoelectric device 40 and the temperature will be described. FIG. 5 is a graph showing a relationship between the resonant frequency of the piezoelectric device 40 and the temperature. In FIG. 5, the horizontal axis represents frequency [kHz], and the vertical axis represents impedance [Ω]. The frequency at which the impedance rapidly changes corresponds to the resonant frequency of the piezoelectric device 40, and the graphs described in FIG. 5 illustrate the changing state in the resonant frequency when the temperature changes from about −40° C. to about 85° C. As can be seen in the graph, as the temperature changes from about −40° C. to about 85° C., the resonant frequency of the piezoelectric device 40 decreases.

Meanwhile, when the foreign substance has adhered to the surface of the protection cover 2, the resonant frequency of the piezoelectric device 40 decreases as the amount of adhering foreign substance increases. Accordingly, by measuring only the change of the resonant frequency of the piezoelectric device 40 by the impedance detector 70, it is impossible to accurately determine whether the change is caused by the adhesion of the foreign substance to the surface of the protection cover 2 or the change is caused by the temperature change. In particular, upon determining that the foreign substance has adhered to the surface of the protection cover 2 only by the resonant frequency, the signal processing circuit 20 may erroneously determines that the foreign substance has adhered to the surface of the protection cover 2 by the temperature rise, since it has been clarified that the resonant frequency of the piezoelectric device 40 decreases because of the temperature rise.

Further, upon erroneously recognizing that the foreign substance has adhered to the surface of the protection cover 2 because of the temperature rise, the signal processing circuit 20 applies the AC output signal to the piezoelectric vibrator 15 in a direction to increase the vibration amplitude of the piezoelectric device 40 to remove the foreign substance. Increasing the vibration amplitude of the piezoelectric device 40 causes the surface temperature of the protection cover 2 to further increase, and the adhesion of the foreign substance to the protection cover 2 makes it further unstable. This makes it difficult for the signal processing circuit 20 to determine.

The resonant frequency change of the piezoelectric device 40 is caused not only by temperature change but also by aging change of the bonding portion between the protection cover 2 and the vibration portion 12, or moisture adsorption at a resin portion, for example. Therefore, the signal processing circuit 20 needs to determine that the foreign substance has adhered to the surface of the protection cover 2 by combining the information on the resonant frequency change of the piezoelectric device 40 and other information.

Figure 6A:
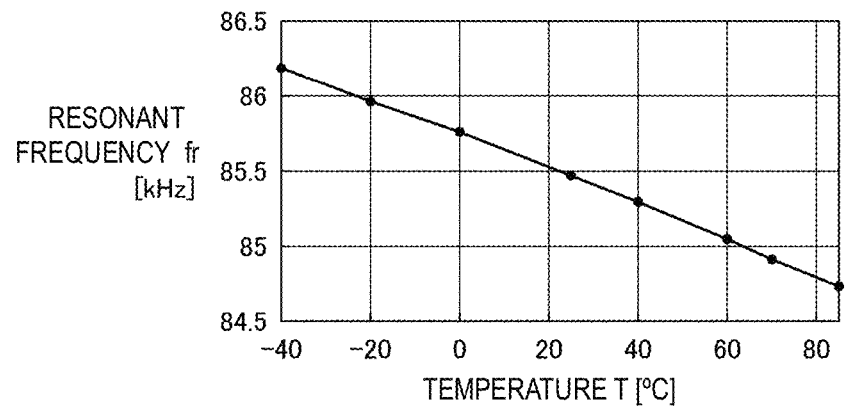
FIGS. 6A and 6B are graphs plotting each of the resonant frequency and the minimum impedance value of the piezoelectric device with respect to temperature.
Figure 6B:
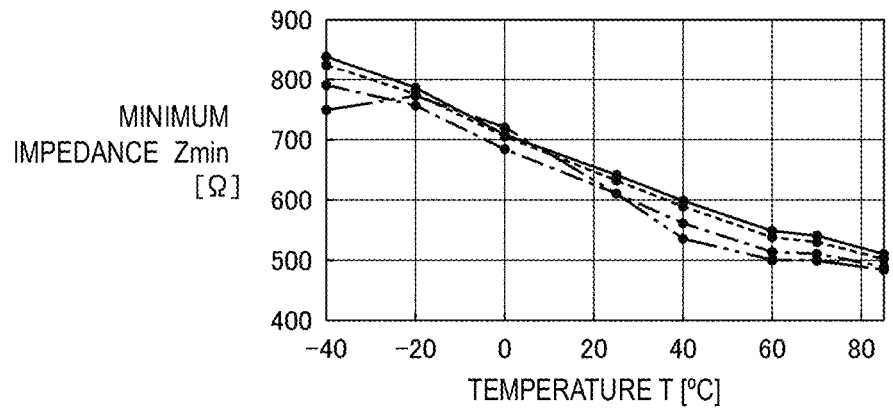

As can be seen in the graph described in FIG. 5, as the temperature changes from about −40° C. to about 85° C., the resonant frequency of the piezoelectric device 40 decreases, and in addition to that, the impedance minimum value also decreases. To facilitate the description of the relationship, a graph of the resonant frequency change of the piezoelectric device 40 with respect to the temperature and a graph of the change of the minimum impedance value with respect to the temperature will separately be described. In FIGS. 6A and 6B, graphs respectively plotting the resonant frequency and the minimum impedance value of the piezoelectric device 40 with respect to the temperature are described.

The change of the resonant frequency of the piezoelectric device 40 with respect to the temperature is described in FIG. 6A. The horizontal axis represents temperature [° C.], and the vertical axis represents resonant frequency [kHz]. As can be seen in the graph in FIG. 6A, the resonant frequency of the piezoelectric device 40 decreases as the temperature increases. The change in the minimum impedance (minimum impedance value) of the piezoelectric device 40 with respect to the temperature is shown in FIG. 6B. The horizontal axis represents temperature [° C.], and the vertical axis represents minimum impedance [Ω]. As can be seen in the graph in FIG. 6B, the minimum impedance of the piezoelectric device 40 decreases as the temperature increases.

Figure 7A:
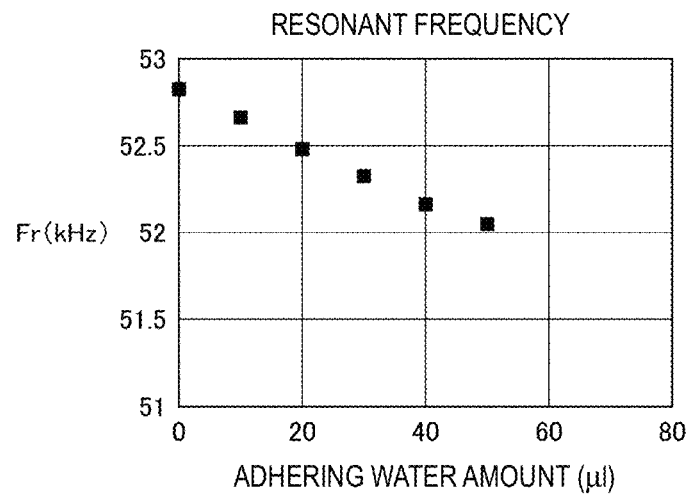
FIGS. 7A and 7B are graphs plotting each of the resonant frequency and the minimum impedance value of the piezoelectric device with respect to an adhesion amount of a foreign substance.
Figure 7B:
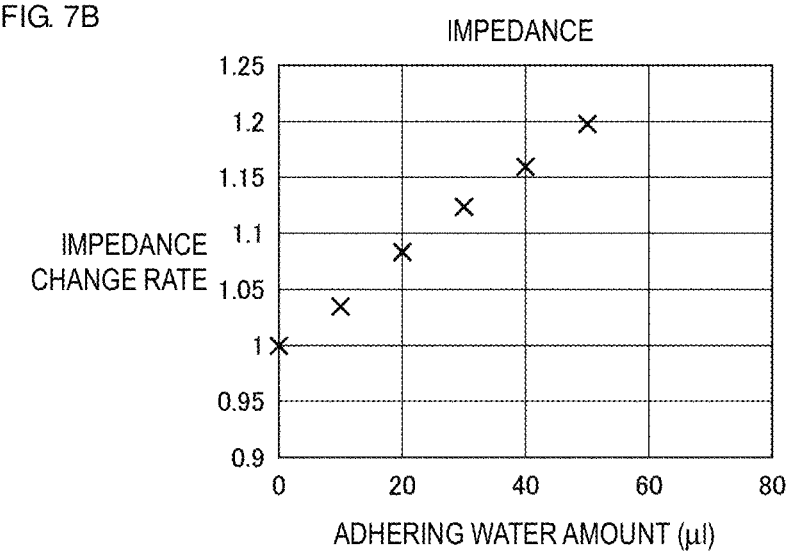

Meanwhile, a description will be provided of the resonant frequency change and the minimum impedance value change of the piezoelectric device 40 when the foreign substance has adhered to the surface of the protection cover 2. In FIGS. 7A and 7B, graphs respectively plotting the resonant frequency and the minimum impedance value of the piezoelectric device 40 with respect to the adhesion amount of the foreign substance are described.

The change of the resonant frequency of the piezoelectric device 40 with respect to the amount of water adhering to the surface of the protection cover 2 is described in FIG. 7A. The horizontal axis represents adhering water amount [μl], and the vertical axis represents resonant frequency [kHz]. As can be seen in the graph in FIG. 7A, the resonant frequency of the piezoelectric device 40 decreases as the adhering water amount increases. The change rate of the minimum impedance (minimum impedance value) of the piezoelectric device 40 with respect to the amount of water adhering to the surface of the protection cover 2 is shown in FIG. 7B. The horizontal axis represents adhering water amount [μl], and the vertical axis represents impedance change rate. As can be seen in the graph in FIG. 7B, the change rate of the minimum impedance of the piezoelectric device 40 increases as the adhering water amount increases. Note that the change rate of the current value I corresponding to the minimum impedance of the piezoelectric device 40 decreases as the adhering water amount increases.

The signal processing circuit 20 determines by combining the change of the resonant frequency of the piezoelectric device and the change of the minimum impedance (minimum impedance value) of the piezoelectric device 40. Thereby, the signal processing circuit 20 may accurately determine whether the change is caused by the adhesion of a foreign substance to the surface of the protection cover 2 or the change is caused by the temperature change as can be seen in the graphs in FIGS. 6A and 6B and FIGS. 7A and 7B. The change of the minimum impedance of the piezoelectric device 40 occurs because of the aging change of the bonding portion between the protection cover 2 and the vibration portion 12 or because of the moisture adsorption at the resin portion, for example. However, this change is different from the change with the adhesion of the foreign substance to the surface of the protection cover 2, and therefore, it is possible to determine by distinguishing the two.

Therefore, the signal processing circuit 20 according to Preferred Embodiment 1 determines that the foreign substance has adhered to the surface of the protection cover 2 with the resonant frequency and the current value (or impedance that is the inverse of current value), instead of determining that the foreign substance has adhered to the surface of the protection cover 2 only by the resonant frequency. That is, the signal processing circuit 20 determines that the foreign substance has adhered to the surface of the protection cover 2 with the change of the resonant frequency and the current value while the piezoelectric device 40 is operated in the search mode.

Returning to FIG. 4, after a certain period of time (one second, for example), the piezoelectric device driver 30 applies the AC output signal to the piezoelectric vibrator 15 setting the drive voltage Vdr to V1 and sweeping the frequency f to operate the piezoelectric device 40 in the search mode. Then, the impedance detector 70 measures the frequency, within the sweeping frequency range f, at which the current of the piezoelectric device driver 30 becomes the maximum as the resonant frequency fr1, and measures the current value at this time as I1 (step S103).

The signal processing circuit 20 obtains difference values between the reference values f and I updated in step S102 and the resonant frequency fr1 and the current value I1, and then, compares the difference values with the predetermined threshold values fth and Ith (step S104). Specifically, the signal processing circuit 20 determines whether or not the relationships of $\Delta fr$ $(=fr1-fr) \leq -fth$ and $\Delta I$ $(=I1-I) \leq -Ith$ are satisfied. That is, the signal processing circuit 20 determines that the foreign substance has adhered to the surface of the protection cover 2 when the change amount of the resonant frequency decrease ($\Delta fr$) is equal to or smaller than the threshold values fth, and at the same time, the change amount of the current value decrease ($\Delta I$) is equal to or less than the threshold value Ith.

As described above, the signal processing circuit 20 does not determine that the foreign substance has adhered to the surface of the protection cover 2 only by the change amount of the resonant frequency (temporal change), but determines that the foreign substance has adhered to the surface of the protection cover 2 with the change amount (temporal change) of the current value relating to the impedance.

When the difference values are larger than the predetermined threshold values fth and Ith (NO in step S104), the signal processing circuit 20 returns the processing to step S102 and updates the reference values f and I with the resonant frequency fr1 and the current value I1 measured in step S104.

When the difference values are equal to or less than the predetermined threshold values fth and Ith (YES in step S104), the signal processing circuit 20 obtains difference values between the reference values f and I and the resonant frequency fr1 and the current value I1, and then, compares the difference values with the predetermined threshold values fth1 and Ith1 (step S105). Note that the threshold values fth1 and Ith1 are larger than the threshold values fth and Ith used in step S104 in absolute value (fth1>fth and Ith1>Ith). Specifically, the signal processing circuit 20 determines whether or not the relationships of $\Delta fr$ $(=fr1-fr) \leq -fth1$ and $\Delta I$ $(=I1-I) \leq -Ith1$ are satisfied. That is, when the change amount of the resonant frequency decrease ($\Delta fr$) is equal to or smaller than the threshold value fth1, and the same time, the change amount of the current value decrease ($\Delta I$) is equal to or smaller than the threshold value Ith1, the signal processing circuit 20 determines that the amount of foreign substance adhering to the surface of the protection cover 2 is large (degree of contamination is large).

The signal processing circuit 20 determines the presence or absence of the foreign substance adhering to the surface of the protection cover 2 by the threshold values fth and Ith, and determines the degree of the foreign substance adhering to the surface of the protection cover 2 by the threshold values fth1 and Ith1.

When the difference values are larger than the predetermined threshold values fth1 and Ith1 (NO in step S105), the signal processing circuit 20 determines that the amount of the foreign substance adhering to the surface of the protection cover is small (degree of contamination is small). Then the piezoelectric device driver 30 applies the AC output signal to the piezoelectric vibrator 15 setting the drive voltage Vdr to V2 (>V1) and the drive frequency fdr to the resonant frequency fmax (step S106), to drive the piezoelectric device 40 in a drive mode. The signal processing circuit 20 executes a drive mode A to drive the piezoelectric device driver 30 alone without driving the cleaning driver 60 (step S107).

Meanwhile, when the difference values are equal to or smaller than the predetermined threshold values fth1 and Ith1 (YES in step S105), the signal processing circuit 20 determines that the amount of the foreign substance adhering to the surface of the protection cover 2 is large (degree of contamination is large). Then, the piezoelectric device driver 30 applies the AC output signal to the piezoelectric vibrator 15 setting the drive voltage Vdr to V3 (<V2) and the drive frequency fdr to the resonant frequency fmax (step S108) to operate the piezoelectric device 40 in the drive mode. That is, the piezoelectric device driver 30 causes the piezoelectric vibrator 15 to vibrate by the smaller amplitude than in the case of step S106. The signal processing circuit 20 executes a drive mode B to drive the cleaning driver 60 to discharge the cleaning liquid, in addition to drive the piezoelectric device driver 30 (step S109). The signal processing circuit 20 is able to strongly clean the foreign substance adhering to the protection cover 2 by executing the drive mode B. Note that the signal processing circuit 20 may switch between the cleaning liquid discharged in the drive mode B and the cleaning liquid having a more intense cleaning power than that, based on at least one piece of information among the resonant frequency, the value relating to the impedance (current value) detected by the impedance detector 70, and the image captured by the imaging portion 5.

When the foreign substance adhering to the surface of the protection cover 2 is removed by the cleaning at step S108 or step S109, the current value Idr measured by the impedance detector 70 increases to a certain degree or more. That is, the current value Idr measured by the impedance detector 70 substantially returns to the current value Idr when no foreign substance has adhered to the surface of the protection cover 2. Therefore, the signal processing circuit 20 determines whether or not the current value Idr measured by the impedance detector 70 has increased by a certain degree or more (step S110).

When the current value Idr has increased by a certain degree or more (YES in step S110), the signal processing circuit determines whether or not an operation to end the cleaning process is received (step S111). When the operation to end the cleaning process has been received (YES in step S111), the signal processing circuit 20 terminates the cleaning process. Meanwhile, when the operation to end the cleaning process has not been received (NO in step S111), the signal processing circuit 20 returns the processing to step S101.

When the current value Idr has not increased by a certain degree or more (NO in step S110), the signal processing circuit 20 determines whether or not the driving in a cleaning process drive mode has continued in excess of a certain period of time (one minute, for example) (step S112). Driving the piezoelectric device 40 in the cleaning process drive mode for a long period of time may cause a problem such as heat generation in the protection cover 2. Therefore, when the driving in the cleaning process drive mode has continued in excess of a certain period of time (YES in step S112), the signal processing circuit 20 terminates the cleaning process as abnormal end. When the driving in the cleaning process drive mode continues within a certain period of time (NO in step S112), the signal processing circuit 20 returns the processing to step S105.

Figure 8:
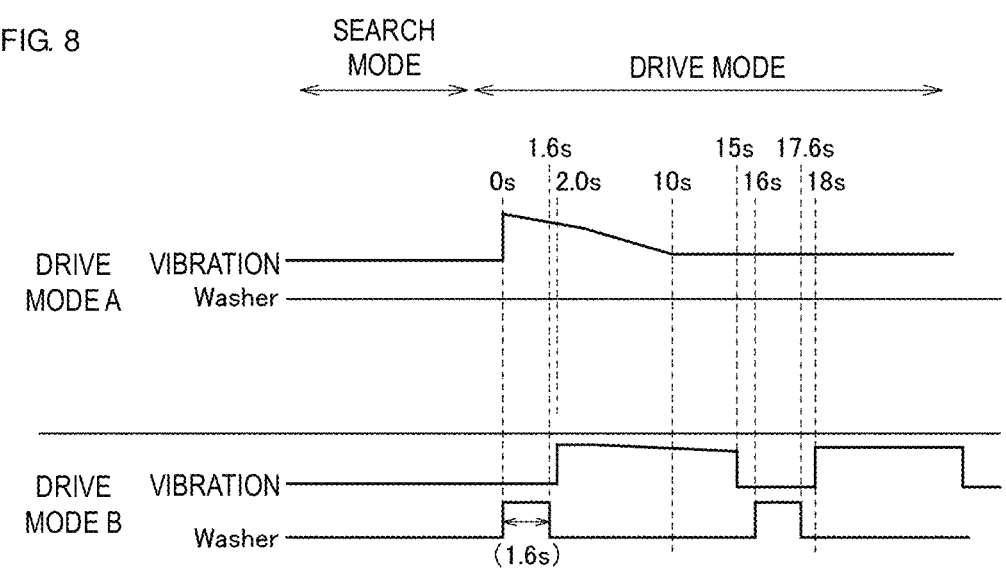
FIG. 8 is a timing chart for describing an operation of the cleaning device for the imaging unit.

Next, operation of the cleaning device for the imaging unit 100 will be described in more detail with reference to a timing chart. FIG. 8 is a timing chart for describing the operation of the cleaning device for the imaging unit. In the timing chart in FIG. 8, a waveform for instructing the operation of drive mode A (FIG. 4: step S107) to the piezoelectric device driver 30 is described in an upper stage, and a waveform for instructing the operation of drive mode B (FIG. 4: step S109) to the piezoelectric device driver 30 accompanying the cleaning liquid discharging operation by the cleaning liquid discharger 50 is described in a lower stage.

First, in the search mode, the signal processing circuit 20 causes the piezoelectric device driver 30 to apply the AC output signal to the piezoelectric vibrator 15 setting the drive voltage Vdr to V1 and sweeping the frequency f to determine whether the foreign substance has adhered to the surface of the protection cover 2.

The signal processing circuit 20 compares each of the measured changes of the resonant frequency fr and the current value I (difference values $\Delta fr$ and $\Delta I$) with the threshold values fth and Ith, and determines the presence or absence of the substance adhering to the protection cover 2. Further, the signal processing circuit 20 determines the degree of the foreign substance adhering to the protection cover 2 by comparing each of the measured changes of the resonant frequency fr and the current value I (difference values $\Delta fr$ and $\Delta I$) with the threshold values fth1 (<fth) and Ith1 (<Ith).

Specifically, the signal processing circuit 20 sweeps the frequency f to scan the frequency in a predetermined range, and determines the frequency at which the current becomes the maximum as the resonant frequency fr, and measures the current at this time as the inverse of the impedance. The signal processing circuit 20 determines that the foreign substance has adhered to the protection cover 2 when the temporal change in the measured resonant frequency fr ($\Delta fr$) is negative and the absolute value of $\Delta fr$ ($|\Delta fr|$) is larger than about 50 Hz, and at the same, time the temporal change of the current value I ($\Delta I$) is negative and the absolute value of $\Delta I$ ($|\Delta I|$) is larger than about 2 mA. Here, it is assumed that the threshold value fth is about 50 Hz and the threshold value Ith is about 2 mA.

Further, the signal processing circuit 20 determines that the foreign substance adhering to the protection cover 2 is large (degree of contamination is large) when the temporal change in the measured resonant frequency fr ($\Delta fr$) is negative and the absolute value of $\Delta fr$ ($|\Delta fr|$) is larger than about 100 Hz, and at the same time, the temporal change of the current value I ($\Delta I$) is negative and the absolute value of $\Delta I$ ($|\Delta I|$) is larger than about 4 mA. Here, it is assumed that the threshold value fth1 is about 100 Hz and the threshold value Ith1 is about 4 mA.

In the search mode, when it is determined that the foreign substance has adhered to the surface of the protection cover 2, and the amount of the foreign substance adhering to the protection cover 2 is small (degree of contamination is small), the signal processing circuit 20 instructs the piezoelectric device driver 30 to operate in the drive mode A. The piezoelectric device driver 30 applies a voltage to cause the piezoelectric vibrator 15 to vibrate at a vibration amplitude of a predetermined magnitude at a timing of the time 0 s, as in the upper stage waveform described in FIG. 8.

Upon being provided with the self-excited oscillation circuit, the piezoelectric device driver 30 may allow the oscillation frequency to follow the resonant frequency and therefore changes the voltage applied to the piezoelectric vibrator 15 so as to adjust the vibration amplitude in accordance with the current value Idr at the resonant frequency fr. That is, as the amount of the foreign substance adhering to the protection cover 2 becomes smaller because of the vibration of the piezoelectric vibrator 15 (timing of time about 1.6 s and time about 2.0 s, for example), the current value Idr at the resonant frequency fr increases. The piezoelectric device driver 30 accordingly decreases the applying voltage to reduce the vibration amplitude of the piezoelectric vibrator 15.

When the current value Idr at the resonant frequency fr increases by a certain degree or more (timing of time about 10 s, for example), the piezoelectric device driver 30 determines that the foreign substance adhering to the protection cover 2 has been removed by the vibration of the piezoelectric vibrator 15, and moves to the search mode again terminating the drive mode.

In the search mode, upon determining that the foreign substance has adhered to the surface of the protection cover 2 and the amount of the foreign substance adhering to the protection cover 2 is large (degree of contamination is large), the signal processing circuit 20 instructs the piezoelectric device driver 30 and the cleaning driver 60 to operate in the drive mode B. The cleaning driver 60 causes the cleaning liquid discharger 50 to discharge the cleaning liquid at the timing of time 0 s as in the upper stage waveform described in FIG. 8 (between time 0 s and time about 1.6 s). Thereafter, the piezoelectric device driver 30 applies a voltage to cause the piezoelectric vibrator 15 to vibrate at a vibration amplitude of a predetermined magnitude at the timing of time about 2.0 s. Note that the timing at which the piezoelectric device driver 30 applies the voltage to cause the piezoelectric vibrator 15 to vibrate may be from the timing of the time 0 s, or from any timing between the time 0 s and the time about 1.6 s.

Upon being provided with the self-excited oscillation circuit, the piezoelectric device driver 30 may allow the oscillation frequency to follow the resonant frequency and therefore changes the voltage applied to the piezoelectric vibrator 15 so as to adjust the vibration amplitude in accordance with the current value Idr at the resonant frequency fr. However, when the foreign substance adhering to the protection cover 2 has no change regardless of the vibration of the piezoelectric vibrator 15, the piezoelectric device driver 30 stops the application of the voltage to the piezoelectric vibrator 15 (timing of time about 15 s, for example).

Thereafter, the cleaning driver 60 causes the cleaning liquid discharger 50 to discharge the cleaning liquid again at the timing of time about 16 s (between time about 16 s and time about 17.6 s). The piezoelectric device driver 30 applies a voltage to cause the piezoelectric vibrator 15 to vibrate at a vibration amplitude of a predetermined magnitude at the timing of time about 18 s.

In the drive mode B, the foreign substance adhering to the surface of the protection cover 2 is cleaned by using both the vibration and the cleaning liquid discharge. Specifically, the cleaning device washes out the foreign substance with the cleaning liquid, and then atomizes the remaining water droplet by the vibration. However, for example, when the foreign substance adhering to the surface of the protection cover 2 is muddy water, atomizing the water droplet first causes the solidified mud component to remain and makes it hard to wash out the mud component by the cleaning liquid. For this reason, in the drive mode B, the muddy water is washed off by the cleaning liquid first and then the remaining water droplet is atomized by the vibration to make the mud component less likely to remain. In addition, providing the vibration to the protection cover 2 to the extent not to atomize the moisture during the discharge of the cleaning liquid causes an effect that the foreign substance adhering to the protection cover 2 floats because of the ultrasonic cleaning effect and is easily washed off. Thus, it is possible to effectively remove the contamination by combining the vibration and the cleaning liquid discharge.

Figure 9:
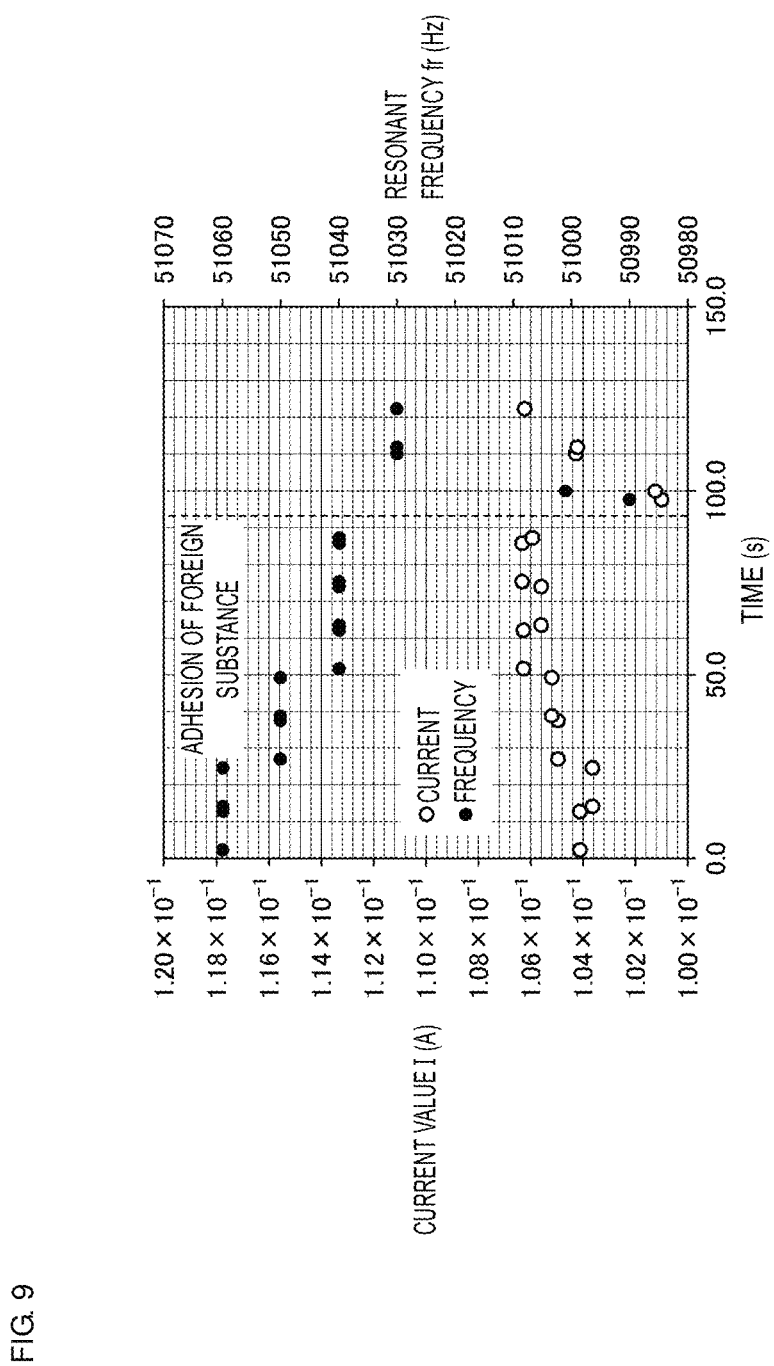
FIG. 9 is a graph showing an experimental result of the cleaning device for the imaging unit according to Preferred Embodiment 1 of the present invention.

As described above, the description has been provided in which the cleaning device for the imaging unit 100 measures the resonant frequency fr and the current value I (or impedance that is the inverse of current value I) of the piezoelectric vibrator 15 and determines that the foreign substance has adhered to the surface of the protection cover 2. Next, an experimental result of the cleaning device will be described. FIG. 9 is a diagram describing an experimental result of the cleaning device for the imaging unit according to Preferred Embodiment 1. In FIG. 9, the horizontal axis represents time (s), the vertical axis on the left side represents the current value I (A), and the vertical axis on the right side represents the resonant frequency fr (Hz).

In the experiment described in FIG. 9, the foreign substance was adhered to the surface of the protection cover 2 by spraying about 100 seconds after the cleaning device for the imaging unit 100 had been turned on. As can be seen in FIG. 9, when the cleaning device is driven in the monitor mode, the resonant frequency fr and the current value I gradually change because of the temperature change. Note that, in the imaging unit 100, it is difficult to determine the adhesion of the foreign substance with only the time differential value since the temperature may rapidly change because of the environmental change, such as sudden exposure to the sunlight, for example. Both of the resonant frequency fr and the current value I of the cleaning device reduce after about 100 seconds because of the foreign substance (water, for example) applied by the spraying. As described above, the cleaning device according to the present preferred embodiment is capable of determining that the foreign substance has adhered to the surface of the protection cover 2 by measuring two parameters (resonant frequency fr and current value I, for example).

That is, the cleaning device according to the present preferred embodiment is capable of distinguishing the change in the electrical characteristics (resonant frequency fr, for example) due to the temperature change or the aging change and the change in the electrical characteristics (current value I, for example) due to the adhesion of the foreign substance to the surface of the protection cover 2, and then capable of preventing the malfunction. Further, the cleaning device according to the present preferred embodiment is capable of effectively cleaning while saving the cleaning liquid in accordance with the degree of the foreign substance adhering to the surface of the protection cover 2 based on the setting of the threshold value. Further, the cleaning device according to the present preferred embodiment does not cause the piezoelectric vibrator 15 to vibrate when the cleaning is unnecessary, and makes the vibration amplitude of the piezoelectric vibrator 15 small when the amount of the foreign substance adhering to the protection cover 2 is small (degree of contamination is small). Thus, the stress applied to the vibration portion 12 is reduced and the lifespan thereof may be increased.

Figure 10A:
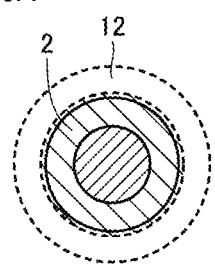
FIGS. 10A to 10C are schematic diagrams illustrating an amplitude displacement when a protection cover 2 is vibrated in different vibration modes.
Figure 10B:
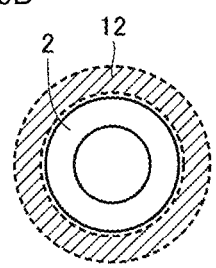
Figure 10C:
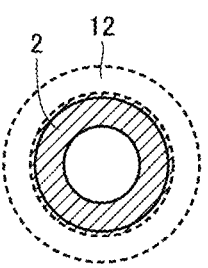

Note that, in the vibration mode to vibrate the protection cover 2 by the vibration portion 12, there is a plurality of vibration modes in addition to a vibration mode which is optimal to atomize the moisture adhering to the protection cover 2 by increasing the vibration displacement in a central portion of the protection cover 2. Hereinafter, the vibration modes will be described with reference to the drawings. FIGS. 10A to 10C are schematic diagrams illustrating an amplitude displacement when the protection cover 2 is vibrated in different vibration modes.

In FIG. 10A, the protection cover 2 when the imaging unit 100 in FIG. 2 is viewed from the left side in FIG. 2 is illustrated and the protection cover 2 is vibrated in the first vibration mode (resonant frequency f1). In the first vibration mode, a portion having large vibration displacement is a central portion of the protection cover 2 (antinode of vibration), and a portion having small vibration displacement is the vibration portion 12 connected to the protection cover 2 (node of vibration). In the drawings, the magnitude of the vibration displacement is represented by hatching, and the hatching with narrow line intervals represents the larger vibration displacement.

In FIG. 10B, the protection cover 2 when the imaging unit 100 in FIG. 2 is viewed from the left side in FIG. 2 is illustrated and the protection cover 2 is vibrated in the second vibration mode (resonant frequency f2). In the second vibration mode, a portion having a large vibration displacement is the vibration portion 12 connected to the protection cover 2 (antinode of vibration), and a portion having a small vibration displacement is a portion of the protection cover 2 (node of vibration).

In FIG. 10C, the protection cover 2 when the imaging unit 100 in FIG. 2 is viewed from the left side in FIG. 2 is illustrated and the protection cover 2 is vibrated in the third vibration mode (resonant frequency f3). In the third vibration mode, a portion having a large vibration displacement is the peripheral portion of the protection cover 2 (antinode of vibration), and a portion having a small vibration displacement is the portion other than the peripheral portion (node of vibration).

In the search mode, vibrating the vibration portion 12 in the second vibration mode in which the portion of the protection cover 2 is a node of vibration reduces the influence of the foreign substance adhering to the protection cover 2, and makes it possible to measure the change in the electrical characteristics due only to the temperature or the aging change. Therefore, the procedure is performed as follows. The vibration portion 12 is vibrated in the first vibration mode in which the portion of the protection cover 2 is an antinode of the vibration, and the change in electrical characteristics receiving a large influence from the foreign substance adhering to the protection cover 2 is measured. The vibration portion 12 is vibrated in the second vibration mode and the change in electrical characteristics is measured. By obtaining the differences in measured results, it is possible to measure the change in the electrical characteristics due only to the foreign substance adhering to the protection cover 2.

The optimum vibration mode for atomization is the first vibration mode, however in the first vibration mode, the sensitivity to the foreign substance is high in the central portion of the protection cover 2 in which the vibration displacement is the maximum, but the sensitivity to the foreign substance is low in other portions. Therefore, in the search mode, the measurement results below may be combined with each other. The vibration portion 12 is vibrated in the first vibration mode and the foreign substance adhering to the central portion of the protection cover 2 is measured with high sensitivity. The vibration portion 12 is vibrated in the third vibration mode and the foreign substance adhering to the peripheral portion of the protection cover 2 is measured with high sensitivity. This makes it possible to detect the foreign substance adhering to all of the positions over the protection cover 2, and further makes it possible to identify the position where the foreign substance is adhered. Further, it is also possible to vibrate only the position where the foreign substance is adhered in the protection cover 2.

Modification

As described above, the description has been provided that measuring the two parameters (resonant frequency fr and current value I, for example) makes it possible to determine that the foreign substance has adhered to the surface of the protection cover 2 in the cleaning device according to the present preferred embodiment. Meanwhile, the determination of the foreign substance adhering to the surface of the protection cover 2 may use the information on the image captured by the imaging portion 5 in addition to measuring the resonant frequency fr and the current value I. For example, the signal processing circuit 20 may take the information on the temporal change in the image captured by the imaging portion 5 into consideration in addition to the change amount (temporal change) of the resonant frequency fr and the change amount (temporal change) of the current value I to determine that the foreign substance has adhered to the surface of the protection cover 2. Further, the signal processing circuit 20 may combine the change amount (temporal change) of the resonant frequency fr and the temporal change in the image captured by the imaging portion 5 to determine that the foreign substance has adhered to the surface of the protection cover 2. Furthermore, the signal processing circuit 20 may combine the change amount (temporal change) of the current value Ir and the temporal change in the image captured by the imaging portion 5 to determine that the foreign substance has adhered to the surface of the protection cover 2.

For example, the signal processing circuit 20 determines that the foreign substance has adhered to the surface of the protection cover 2 when the change amount of the resonant frequency fr is larger than the absolute value of the threshold value fth, and at the same time, the brightness integral value of the image captured by the imaging portion 5 decreases. Thus, by taking the change amount of the resonant frequency fr into consideration, the signal processing circuit 20 is able to distinguish between a decrease in brightness integral value occurring when the vehicle equipped with the imaging unit 100 enters a tunnel, for example, and a decrease in brightness integral value caused by the adhesion of the foreign substance to the surface of the protection cover 2.

In addition, the signal processing circuit 20 determines that the foreign substance adhering to the surface of the protection cover 2 is an opaque substance such as mud when the change amount of the resonant frequency fr and the change amount of the current value I are larger than respective absolute values of the threshold values fth and Ith, and at the same time, the brightness integral value of the image captured by the imaging portion 5 greatly decreases. The signal processing circuit 20 determines that the foreign substance adhering to the surface of the protection cover 2 is a transparent substance such as water when a decrease in the brightness integral value of the image captured by the imaging portion 5 is small. As described above, the signal processing circuit 20 is able to accurately determine the type of the foreign substance adhering to the surface of the protection cover 2 and accurately determine the presence or absence of the cleaning liquid discharge by taking the information on the temporal change in the image captured by the imaging portion 5 into consideration.

Next, operation of the cleaning device according to Modification of Preferred Embodiment 1 will be described based on a flowchart. FIG. 11 is a flowchart for describing the operation of the cleaning device for the imaging unit according to Modification of Preferred Embodiment 1. In the flowchart described in FIG. 11, the same processing as that in the flowchart described in FIG. 4 is denoted by the same step numbers, and the detailed description thereof will not be repeated. First, the impedance detector 70 measures the frequency, within the sweeping frequency range f, at which the current of the piezoelectric device driver 30 becomes the maximum (or impedance being the inverse of current value becomes the minimum) as the initial resonant frequency fr0, and measures the current value at this time as I0 (step S101). The signal processing circuit 20 updates the reference values f and I with the initial resonant frequency fr0 and the current value I0 (step S102).

After a certain period of time (after about one second, for example), the piezoelectric device driver 30 applies the AC output signal to the piezoelectric vibrator 15 setting the drive voltage Vdr to V1 and sweeping the frequency f to operate the piezoelectric device 40 in the search mode. Then, the impedance detector 70 measures the frequency, within the sweeping frequency range f, at which the current of the piezoelectric device driver 30 becomes the maximum as the resonant frequency fr1, and measures the current value at this time as I1 (step S103).

The signal processing circuit 20 obtains difference values between the reference values f and I updated in step S102 and the resonant frequency fr1 and the current value I1, and then, compares the difference values with the predetermined threshold values fth and Ith (step S104).

When the difference values are larger than the predetermined threshold values fth and Ith (NO in step S104), the signal processing circuit 20 returns the processing to step S102 and updates the reference values f and I with the resonant frequency fr1 and the current value I1 measured in step S104.

When the difference values are equal to or less than the predetermined threshold values fth and Ith (YES in step S104), the signal processing circuit 20 determines whether or not the brightness integral value (temporal change) of the image captured by the imaging portion 5 decreases by a certain degree or more (step S205). When the opaque foreign substance such as mud has adhered to the surface of the protection cover 2, the brightness of the image captured by the imaging portion 5 sharply decreases. Therefore, the signal processing circuit 20 is able to determine the degree of the foreign substance based on the temporal change in the image, without determining the degree of the foreign substance adhering to the surface of the protection cover 2 using the threshold values fth1 and Ith1 that are larger than the threshold values fth and Ith in absolute values.

When the brightness integral value of the image has not decreased by a certain degree or more (NO in step S205), the signal processing circuit 20 determines that the foreign substance adhering to the surface of the protection cover 2 is a transparent material such as water. Then, the piezoelectric device driver 30 applies the AC output signal to the piezoelectric vibrator 15 setting the drive voltage Vdr to V2 (>V1) and the drive frequency fdr to the resonant frequency fmax to operate the piezoelectric device 40 in the drive mode (step S106). The signal processing circuit 20 executes a drive mode A to drive the piezoelectric device driver 30 alone without driving the cleaning driver 60 (step S107).

Meanwhile, when the brightness integral value of the image has decreased by a certain degree or more (YES in step S205), the signal processing circuit 20 determines that the foreign substance adhering to the surface of the protection cover 2 is an opaque substance such as mud. Then, the piezoelectric device driver 30 applies the AC output signal to the piezoelectric vibrator 15 setting the drive voltage Vdr to V3 (<V2) and the drive frequency fdr to the resonant frequency fmax to operate the piezoelectric device 40 in the drive mode (step S108). The signal processing circuit 20 executes the drive mode B to drive the cleaning driver 60 to discharge the cleaning liquid, in addition to drive the piezoelectric device driver 30 (step S109).

The signal processing circuit 20 determines whether or not the current value Idr measured by the impedance detector 70 has increased by a certain degree or more (step S110). When the current value Idr has increased by a certain degree or more (YES in step S110), the signal processing circuit 20 determines whether or not an operation to end the cleaning process is received (step S111). When the operation to end the cleaning process has been received (YES in step S111), the signal processing circuit 20 terminates the cleaning process. Meanwhile, when the operation to end the cleaning process has not been received (NO in step S111), the signal processing circuit 20 returns the processing to step S101.

When the current value Idr has not increased by a certain degree or more (NO in step S110), the signal processing circuit 20 determines whether or not the driving in the cleaning process drive mode has continued in excess of a certain period of time (30 minutes, for example) (step S112). Driving the piezoelectric device 40 in the cleaning process drive mode for a long period of time may cause a problem such as heat generation in the protection cover 2. Therefore, when the driving in the cleaning process drive mode has continued in excess of a certain period of time (YES in step S112), the signal processing circuit 20 terminates the cleaning process as abnormal end. When the driving in the cleaning process drive mode continues within a certain period of time (NO in step S112), the signal processing circuit 20 returns the processing to step S105.

As described above, the imaging unit 100 according to Preferred Embodiment 1 is provided with the cleaning device. The cleaning device includes the housing 1 holding the imaging portion 5, the protection cover 2 disposed in a field of view of the imaging portion 5, the vibration portion 12 vibrating the protection cover 2, the piezoelectric device driver 30 driving the vibration portion 12, the signal processing circuit 20 controlling the piezoelectric device driver 30, and the impedance detector 70 detecting a value relating to the impedance (current value I) of the vibration portion 12 driven by the signal processing circuit 20. The signal processing circuit 20 determines that the foreign substance has adhered to the surface of the protection cover 2 based on at least two pieces of information among the change amount of the resonant frequency ($\Delta f$) when the vibration portion 12 is driven at the first voltage (V1), the change amount of the current value ($\Delta I$) relating to the impedance detected by the impedance detector 70, and the temporal change in the image (brightness integral value) captured by the imaging portion 5. The signal processing circuit 20 then controls the vibration portion 12 in accordance with the determination and cleans the surface of the protection cover 2.

Thus, the cleaning device according to Preferred Embodiment 1 determines that the foreign substance has adhered to the surface of the protection cover 2 based on at least two pieces of information, cleans the surface of the protection cover 2 controlling the vibration portion 12 in accordance with the determination, and thus, is capable of cleaning with high efficiency.

The signal processing circuit 20 may determine the drive frequency fdr to drive the vibration portion 12 to clean the surface of the protection cover 2, and may drive the vibration portion 12 with the drive frequency fdr and the second voltage (V2) upon determining that the foreign substance has adhered to the surface of the protection cover 2. With this, the piezoelectric device driver 30 is able to clean the surface of the protection cover 2 at the appropriate drive frequency fdr and the second voltage (V2).

The signal processing circuit 20 may determine that the foreign substance has adhered to the surface of the protection cover 2 when the change amount of the resonant frequency ($\Delta f$) during the driving of the vibration portion 12 at the first voltage (V1) is negative, and the temporal change in impedance detected by the impedance detector 70 is positive (change amount of current value ($\Delta I$) is negative). With this, the signal processing circuit 20 may accurately determine whether the change is caused by the adhesion of a foreign substance to the surface of the protection cover 2 or the change is caused by the temperature change.

The signal processing circuit 20 may determine that the foreign substance has adhered to the surface of the protection cover 2 when the change amount of the resonant frequency (Δf) during the driving of the vibration portion 12 at the first voltage (V1) is negative, and the temporal change of the brightness (brightness integral value) obtained from the image captured by the imaging portion 5 is negative. With this, the signal processing circuit 20 may accurately determine the type of the foreign substance adhering to the surface of the protection cover 2, and may accurately determine the presence or absence of the cleaning liquid discharge.

The signal processing circuit 20 may determine that the foreign substance has adhered to the surface of the protection cover 2 when the temporal change in impedance detected by the impedance detector 70 is positive (change amount of current value (ΔI) is negative), and the temporal change of the brightness (brightness integral value) obtained from the image captured by the imaging portion 5 is negative. With this, the signal processing circuit 20 may accurately determine the type of the foreign substance adhering to the surface of the protection cover 2, and may accurately determine the presence or absence of the cleaning liquid discharge.

The signal processing circuit 20 may identify the type of the foreign substance adhering to the surface of the protection cover 2 based on an analysis result (brightness integral value) of the image captured by the imaging element. With this, the signal processing circuit 20 determines that the foreign substance adhering to the surface of the protection cover 2 is an opaque substance such as mud.

The signal processing circuit 20 may drive the vibration portion 12 in a plurality of vibration modes, and a vibration mode to drive the vibration portion 12 to determine the adhesion of the foreign substance to the surface of the protection cover 2 (first vibration mode and second vibration mode, for example) may be different from the vibration mode to drive the vibration portion 12 to clean the surface of the protection cover 2 (first vibration mode, for example). With this, the signal processing circuit 20 is able to measure the change in the electrical characteristics due only to the foreign substance adhering to the protection cover 2.

The signal processing circuit 20 may change the voltage (V2 or V3) to drive the vibration portion 12 to clean the surface of the protection cover 2 based on at least one value of the resonant frequency and the impedance. With this, the signal processing circuit 20 may change the vibration amplitude of the piezoelectric vibrator 15 in accordance with the degree of the foreign substance adhering to the protection cover 2.

The cleaning liquid discharger 50 to discharge the cleaning liquid (cleaning body) onto the surface of the protection cover 2 may further be provided, and the signal processing circuit 20 may cause the cleaning liquid discharger 50 to discharge the cleaning liquid in accordance with the determination that the foreign substance has adhered to the surface of the protection cover 2. With this, the signal processing circuit 20 may more strongly clean the foreign substance adhering to the protection cover 2.

The signal processing circuit 20 may set the voltage to drive the vibration portion 12 equal to or higher than the first voltage (V1) and equal to or lower than the second voltage (V2) upon causing the cleaning liquid discharger 50 to discharge the cleaning liquid to clean the surface of the protection cover 2. With this, the signal processing circuit 20 may also perform cleaning by the vibration in combination with the cleaning by the cleaning liquid discharge. The signal processing circuit 20 weakly drives the vibration portion 12 since the cleaning with the same vibration amplitude as that in the cleaning only by the vibration atomizes the cleaning liquid and may not be able to use the cleaning liquid effectively.

The cleaning liquid discharger 50 may discharge a first cleaning liquid to clean the surface of the protection cover 2 and a second cleaning liquid having a more intense cleaning power than the first cleaning liquid. The signal processing circuit 20 may switch between the first cleaning liquid and the second cleaning liquid based on at least one piece of information among the resonant frequency when the vibration portion 12 is driven at the first voltage, the value relating to the impedance (current value) detected by the impedance detector 70, and the image captured by the imaging portion 5. With this, the signal processing circuit 20 may more strongly clean the foreign substance adhering to the protection cover 2.

Preferred Embodiment 2

In the cleaning device according to Preferred Embodiment 1, only the voltage applied to the piezoelectric vibrator 15 is changed by the signal processing circuit 20 in accordance with the degree of the foreign substance adhering to the surface of the protection cover 2. There will be described the configuration of the cleaning device according to the present preferred embodiment in which the signal processing circuit 20 sweeps the frequency applied to the piezoelectric vibrator 15 in accordance with the degree of the foreign substance adhering to the surface of the protection cover 2.

Figure 12:
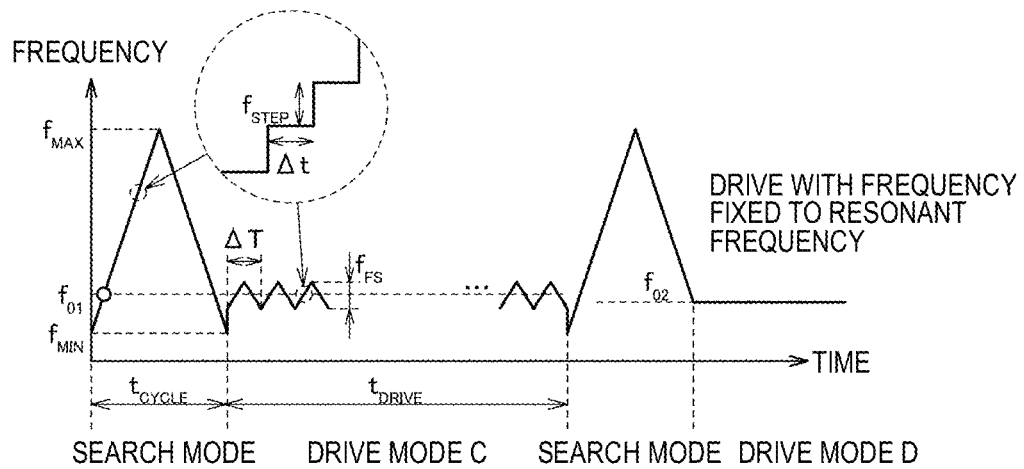
FIG. 12 is a timing chart for describing control of a cleaning device for an imaging unit according to Preferred Embodiment 2 of the present invention.

FIG. 12 is a timing chart for describing the control of the cleaning device for the imaging unit according to Preferred Embodiment 2 of the present invention. In the timing chart in FIG. 12, during the search mode period ($t_{CYCLE}$ period), the piezoelectric device driver 30 applies the AC output signal to the piezoelectric vibrator 15 setting the drive voltage Vdr to V1, for example, and sweeping the frequency f from $f_{MIN}$ to $f_{MAX}$. The signal processing circuit 20 applies the AC output signal to the piezoelectric vibrator 15 sweeping the frequency thereof in the vicinity of the resonant frequency $f_{01}$ upon determining that the foreign substance adhering to the surface of the protection cover 2 is water based on the measurement results of the resonant frequency and the current value in the search mode. Note that the signal processing circuit 20 may determine the presence or absence and the degree of the foreign substance adhering to the surface of the protection cover 2 with the configuration described in Preferred Embodiment 1.

The signal processing circuit 20 applies the AC output signal to the piezoelectric vibrator 15 sweeping the frequency thereof within the range $f_{FS}$ in the vicinity of the resonant frequency $f_{01}$ in the period ΔT as in the drive mode C described in FIG. 12. With this, the cleaning device may prevent the excessive temperature rise of the protection cover 2 due to the continuation of the vibration at the resonant frequency $f_{01}$, and may atomize the water (droplet) adhering to the surface of the protection cover 2. Further, the cleaning device may avoid the phenomenon in which the water film adhering to the surface of the protection cover 2 vibrates in a steady state and remains without atomizing by sweeping the frequency of the AC output signal applied to the piezoelectric vibrator 15 within the range $f_{FS}$ in the vicinity of the resonant frequency $f_{01}$.

Note that the frequency of the AC output signal applied to the piezoelectric vibrator 15 changes in a step manner in the search mode and the drive mode C as described in FIG. 12.

Specifically, the AC output signal increases or decreases by the frequency $f_{STEP}$ for each period $\Delta t$.

The signal processing circuit 20 drives the piezoelectric vibrator 15 in the drive mode C during a period $\Delta t_{DRIVE}$ and in the search mode again, and then determines that the foreign substance adhering to the surface of the protection cover 2 is mud based on the measurement results of the resonant frequency and the current value in the search mode. The signal processing circuit 20 applies the AC output signal to the piezoelectric vibrator 15 fixing the frequency thereof to the resonant frequency foe upon determining that the foreign substance is mud. This is because the cleaning by vibrating the foreign substance with a "shake off" operation is effective rather than the atomization when mud has adhered to the surface of the protection cover 2. That is, the signal processing circuit 20 drives the piezoelectric vibrator 15 with the frequency fixed to the resonant frequency foe as the drive mode D and applies the maximum energy to the foreign substance to drop off from the surface of the protection cover 2.

Here, the reason why mud is less likely to be atomized will be described by the relationship between the surface tension and the specific gravity. To atomize water (droplet), energy of cavitation waves generated on the surface of water (droplet) needs to overcome the surface tension of water (droplet). Therefore, when a foreign substance having a large surface tension has adhered to the surface of the protection cover 2, larger energy needs to be applied to the surface of the water (droplet) to atomize the foreign substance.

The surface tension varies depending not only on the kind of liquid, but also on the temperature of the liquid. In a low temperature side in which the surface tension is large, the vibration amplitude of the piezoelectric vibrator 15 needs to be increased to provide atomization. Further, the signal processing circuit 20 needs to change the vibration amplitude of the piezoelectric vibrator 15 in accordance with the temperature to effectively atomize the foreign substance adhering to the surface of the protection cover 2.

Furthermore, when muddy water has adhered to the surface of the protection cover 2, the cleaning device may use a cleaning method in accordance with the mud and water as described above without relying on the cleaning liquid discharge. In addition, the signal processing circuit 20 may control the driving in the drive modes C and D with a duty value of $t1/(t1+t2)$, where the time t1 is the duration of strong vibration in the vicinity of the resonant frequency and the time t2 is the duration of vibration at the frequency other than in the vicinity of the resonant frequency. That is, the signal processing circuit 20 may apply the AC output signal to the piezoelectric vibrator 15 sweeping the frequency thereof within the range $f_{FS}$ in the vicinity of the resonant frequency $f_{o1}$ as in the drive mode C, by setting the time t2 to be longer compared with the time t1. Further, the signal processing circuit 20 may apply the AC output signal to the piezoelectric vibrator 15 fixing the frequency thereof to the resonant frequency foe as in the drive mode D, by setting the time t1 to be longer compared with the time t2.

As described above, in the cleaning device according to Preferred Embodiment 2, the signal processing circuit 20 includes the first period (time t1) to drive at the frequency in the vicinity of the resonant frequency and the second period (time t2) to drive at the frequency other than in the vicinity of the resonant frequency for the driving of the vibration portion 12 to clean the surface of the protection cover 2, and determines the duty ratio of the first period and the second period, based on at least one piece of information among the resonant frequency when the vibration portion 12 is driven at the first voltage, the value relating to the impedance (current value) detected by the impedance detector 70, and the image captured by the imaging portion 5.

With this, in the cleaning device according to Preferred Embodiment 2, it is possible to remove the foreign substance adhering to the surface of the protection cover 2 by applying an appropriate vibration in accordance with the foreign substance.

Preferred Embodiment 3

In the cleaning device according to Preferred Embodiment 1, description has been provided that the resonant frequency of the piezoelectric device 40 varies depending on the temperature. In the cleaning device according to the present preferred embodiment, a configuration will be described in which a temperature measurement unit to measure the temperature is provided.

Figure 13:
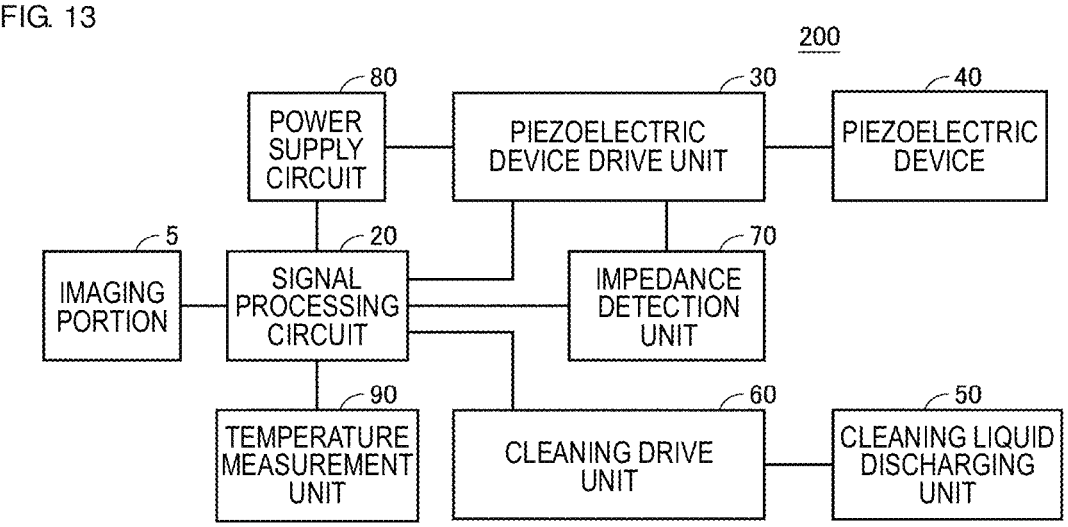
FIG. 13 is a block diagram for describing control of a cleaning device for an imaging unit according to Preferred Embodiment 3 of the present invention.

FIG. 13 is a block diagram for describing the control of the cleaning device for an imaging unit 200 according to Preferred Embodiment 3 of the present invention. The imaging unit 200 includes the imaging portion 5, the signal processing circuit 20, the piezoelectric device driver 30, the piezoelectric device 40, the cleaning liquid discharger 50, the cleaning driver 60, the impedance detector 70, the power supply circuit 80, and a temperature measurement unit 90. The imaging unit 200 has the same or substantially the same configuration as the imaging unit 100 illustrated in FIG. 3 except that the temperature measurement unit 90 is added, and the same reference numerals are used for the same or corresponding components, and detailed description thereof will not be repeated.

The temperature measurement unit 90 is capable of measuring the temperature in the vicinity of the imaging unit 200, for example, the vibration portion 12 or the protection cover 2. The temperature measurement unit 90 only needs to be able to output the measured temperature to the signal processing circuit 20, and a known temperature sensor or a temperature measurement device may be used.

Figure 14:
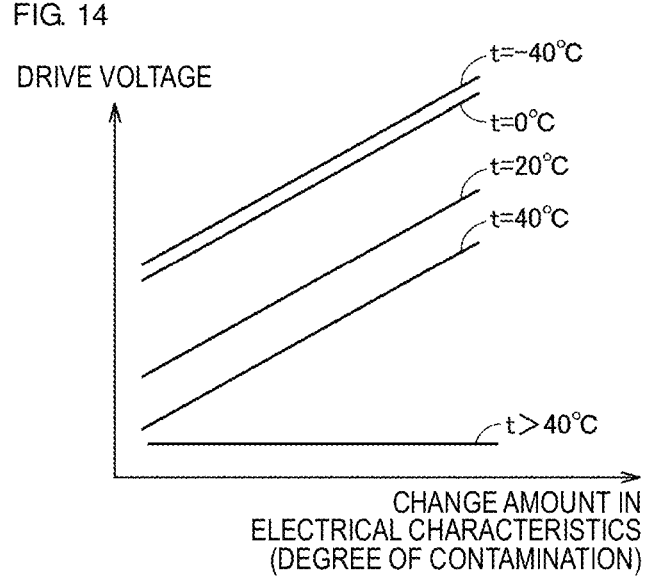
FIG. 14 is a graph for describing a relationship between a change amount in electrical characteristics and a drive voltage.

The signal processing circuit 20 changes the drive voltage to apply to the piezoelectric vibrator 15 in the drive mode to remove the foreign substance adhering to the surface of the protection cover 2 by using the information on the temperature measured by the temperature measurement unit 90. FIG. 14 is a diagram for describing a relationship between a change amount in the electrical characteristics and the drive voltage. In FIG. 14, the horizontal axis represents the change amount in the electrical characteristics (change amount of current value ($\Delta I$), for example), and the vertical axis represents the drive voltage. As described in FIG. 14, the drive voltage applied to the piezoelectric vibrator 15 is the same or almost same at the temperature higher than about 40° C. even when the change amount in the electrical characteristics varies. Note that as the change amount in electrical characteristics increases, the amount of the foreign substance adhering to the surface of the protection cover 2 becomes larger (the degree of contamination becomes larger).

The drive voltage applied to the piezoelectric vibrator 15 becomes a higher voltage as the change amount of the electrical characteristics changes when the temperature is equal to or lower than about 40° C. That is, the foreign substance (droplet, for example) adhering to the surface of the protection cover 2 increases in the surface tension and becomes less likely to be atomized and drop out as the temperature becomes lower. The signal processing circuit 20 therefore increases the drive voltage applied to the piezoelectric vibrator 15 so as to compensate for the increase in the surface tension. Further, when the vibration amplitude of the piezoelectric vibrator 15 has a temperature characteristic, the signal processing circuit 20 may be set to compensate for the temperature characteristic of the vibration amplitude in addition to the compensation for the surface tension.

As can be seen in FIG. 14, it is preferable that the drive voltage to be applied to the piezoelectric vibrator 15 is higher as the temperature becomes lower. The temperature measurement unit 90 has been described as a temperature sensor or a temperature measuring device. However, the temperature may be estimated from the change amount of the resonant frequency of the piezoelectric device 40 described in FIG. 6A and the change amount in the impedance of the piezoelectric device 40 described in FIG. 6B without additively providing a temperature sensor or a temperature measurement device. That is, the temperature may be measured as the processing in the signal processing circuit 20 without providing the temperature measurement unit 90 to the imaging unit 200 illustrated in FIG. 13.

As described above, in the cleaning device according to Preferred Embodiment 3, the signal processing circuit 20 estimates the temperature of the protection cover 2 based on the change amount of the resonant frequency (Δf) when the vibration portion 12 is driven at the first voltage (V1) and the change amount of the current value (ΔI) relating to the impedance detected by the impedance detector 70. Then, the signal processing circuit 20 changes the voltage to drive the vibration portion 12 based on the estimated temperature when the surface of the protection cover 2 is cleaned.

With this, the cleaning device according to Preferred Embodiment 3 may reduce or prevent the deterioration of the cleaning performance at a low temperature without additively providing the temperature measurement unit. Further, the cleaning device may prevent a decrease in the lifespan at a high temperature because of the stress to the bonding portion generated by an unnecessary vibration.

Further, the cleaning device according to Preferred Embodiment 3 may further include the temperature measurement device 90 to measure the temperature of the vibration portion 12 or the protection cover 2, and the signal processing circuit 20 may change the voltage to drive the vibration portion 12 based on the measurement result of the temperature measurement device 90 when the surface of the protection cover 2 is cleaned. With this, the cleaning device according to Preferred Embodiment 3 may reduce or prevent the deterioration of the cleaning performance at a low temperature using the measurement result of the temperature measurement device 90.

Preferred Embodiment 4

In the cleaning device according to Preferred Embodiment 1, the impedance detector 70 monitors the current of the piezoelectric device driver 30 while the piezoelectric device 40 is operated, and thus determines that the foreign substance has adhered to the surface of the protection cover 2. In the cleaning device according to the present preferred embodiment, a description will be provided of a configuration in which the adhesion of the foreign substance to the surface of the protection cover is determined by using the difference between the gradients of the impedance change rate with respect to the resonant frequency change rate.

The imaging unit according to Preferred Embodiment 4 of the present invention has the same or substantially the same configuration as that of the imaging unit 100 illustrated in FIG. 3. The signal processing circuit 20 has the same or substantially the same configuration as that of the imaging unit 100 except for being capable of storing the impedance value detected by the impedance detector 70 and the resonant frequency, therefore, the same reference numerals are used for the same or corresponding components, and detailed description thereof will not be repeated.

Figure 15:
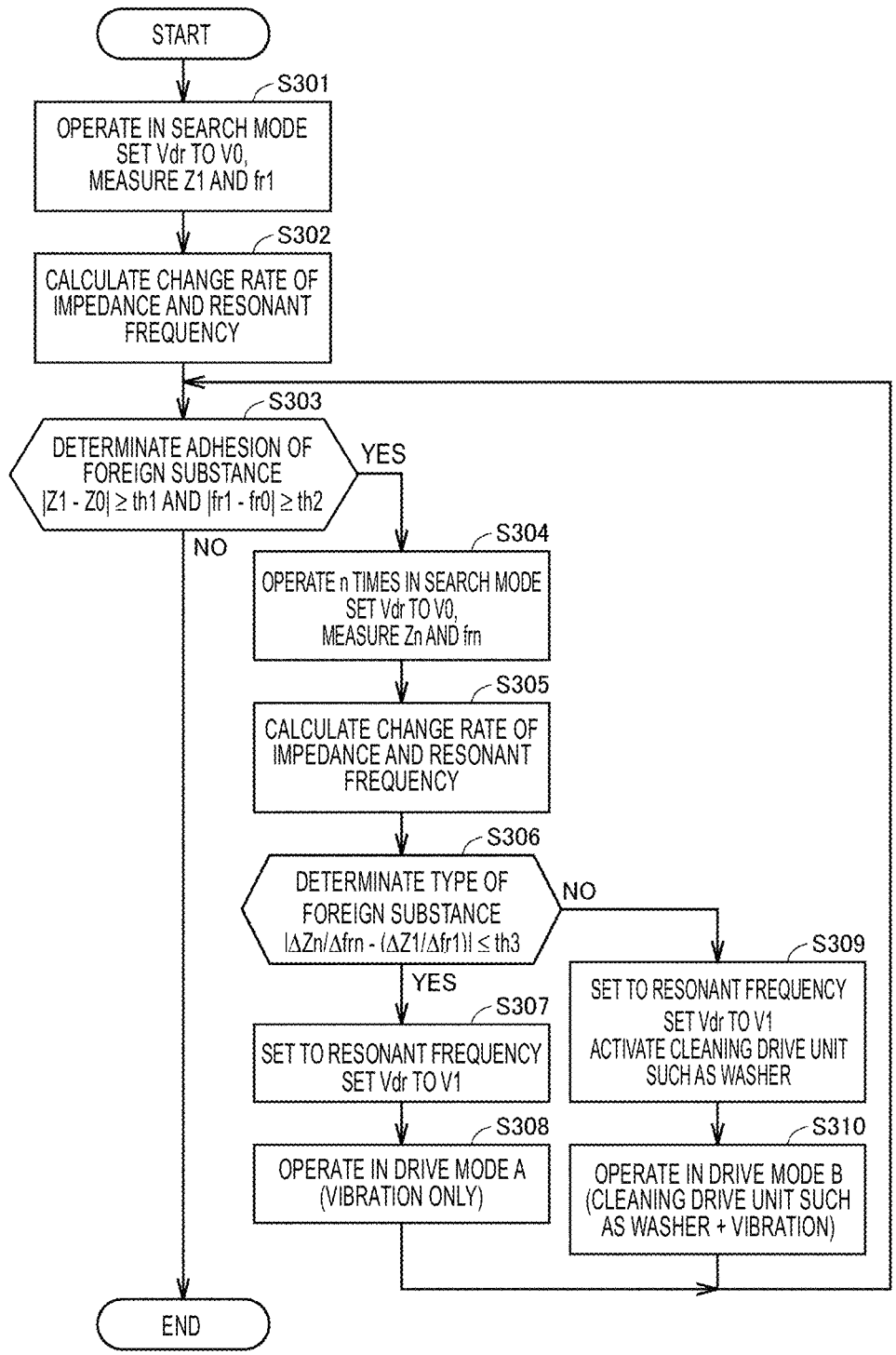
FIG. 15 is a flowchart for describing an operation of a cleaning device for an imaging unit according to Preferred Embodiment 4 of the present invention.

Operation of the cleaning device for the imaging unit according to Preferred Embodiment 4 will be described based on a flowchart. FIG. 15 is a flowchart for describing the operation of the cleaning device for the imaging unit according to Preferred Embodiment 4. First, the signal processing circuit 20 causes the piezoelectric device 40 to operate in the search mode, and determines that a foreign substance has adhered to the surface of the protection cover 2. The piezoelectric device driver 30 applies the AC output signal to the piezoelectric vibrator 15 setting the drive voltage Vdr to V0 and sweeping the frequency f to operate the piezoelectric device 40 in the search mode. It is preferable that the drive voltage Vdr of the AC output signal applied to the piezoelectric vibrator 15 is smaller from the viewpoint of suppressing heat generation.

The impedance detector 70 monitors the impedance of the piezoelectric device driver 30 while the piezoelectric device 40 is operated in the search mode. Specifically, the impedance detector 70 measures the frequency, within the sweeping frequency range f, at which the current of the piezoelectric device driver 30 becomes the maximum (or impedance being the inverse of current value becomes the minimum) as the initial resonant frequency fr1, and measures the impedance at this time as Z1 (Step S301). Note that the signal processing circuit 20 stores the measured initial resonant frequency fr1 and the measured impedance Z1. The impedance Z0 which is a reference value of the impedance and the resonant frequency fr0 which is a reference value of the resonant frequency are stored in the signal processing circuit 20 in advance.

Figure 16:
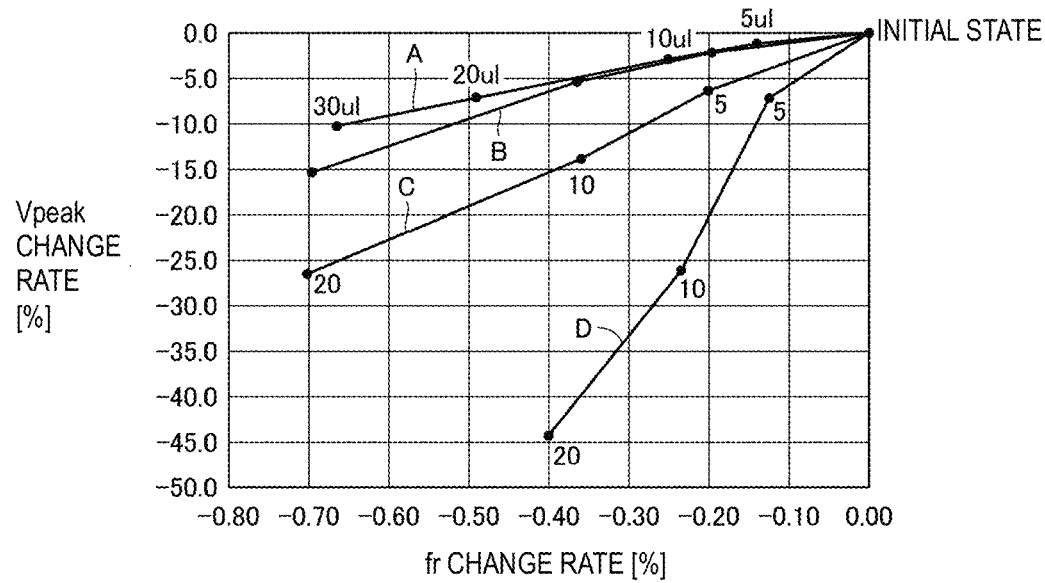
FIG. 16 is a graph showing a relationship between a voltage change rate and a resonant frequency change rate of a piezoelectric device.

Here, the relationship between the change rate of the voltage and the change rate of the resonant frequency of the piezoelectric device 40 will be described. FIG. 16 are graphs showing relationships between the change rate of the voltage and the change rate of the resonant frequency of the piezoelectric device 40. In FIG. 16, the horizontal axis represents the change rate of the resonant frequency [%], and the vertical axis represents the change rate of the voltage [%]. The graph in FIG. 16 is described as follows. The graph A describes a case in which a foreign substance being water alone has adhered to the surface of the protection cover 2. The graph B describes a case in which a foreign substance being muddy water (muddy water 50%) has adhered to the surface of the protection cover 2, where the muddy water contains about 50% weight percentage of mud in the water. The graph C describes a case in which a foreign substance being muddy water (muddy water 100%) has adhered to the surface of the protection cover 2, where the muddy water contains about 100% weight percentage of mud in the water. The graph D describes a case in which a foreign substance being muddy water (muddy water 200%) has adhered to the surface of the protection cover 2, where the muddy water contains about 200% weight percentage of mud in the water.

As can be seen in the graphs described in FIG. 16, it is discovered that the gradients of the voltage change rate with respect to the resonant frequency change rate differ from each other depending on the foreign substance adhering to the surface of the protection cover 2. Further, it was discovered in an experiment that when the foreign substance is removed by vibrating the protection cover 2 several times, the gradient of the graph B to the graph D approaches the gradient of the graph A. That is, in the gradient of the voltage change rate with respect to the resonant frequency change rate, the gradient in a case of muddy water approaches the gradient in a case of water by vibrating the protection cover 2 several times. Since the voltage and the impedance have a proportional relationship, the gradient of the voltage change rate with respect to the resonant frequency change rate tends to be the same or substantially the same as the gradient of the impedance change rate (temporal change) with respect to the resonant frequency change rate (temporal change).

Therefore, the cleaning device for the imaging unit according to Preferred Embodiment 4 determines the foreign substance adhering to the surface of the protection cover 2 by using the difference in the gradients of the impedance change rate with respect to the resonant frequency change rate. Specifically, the cleaning device may even determine the type of the foreign substance adhering to the surface of the protection cover 2 by storing the gradient of the impedance change rate with respect to the resonant frequency change rate in the past and comparing it with the gradient measured this time.

Referring back to FIG. 4, the signal processing circuit 20 calculates $\Delta Z1$ which is the change rate of the impedance Z1 measured in step S301 with respect to the impedance Z0 as $\Delta Z1=Z1/Z0$, and calculates $\Delta fr1$ which is the change rate of the measured resonant frequency fr1 with respect to the resonant frequency fr0 as $\Delta fr1=fr1/fr0$ (step S302). The signal processing circuit 20 stores the change rate of the impedance $\Delta Z1$ and the change rate of the resonant frequency $\Delta fr$ calculated in step S302.

The signal processing circuit 20 obtains the difference between the measured impedance Z1 and the impedance Z0 and the difference between the measured resonant frequency fr1 and the resonant frequency fr0 to determine whether or not the foreign substance has adhered to the surface of the protection cover 2. The signal processing circuit 20 determines whether or not the obtained difference $|Z1-Z0|$ is equal to or larger than the threshold value th1, and at the same time, the obtained difference $|fr1-fr0|$ is equal to or larger than the threshold value th2 (step S303). For example, in a case where the impedance Z0 is about 100Ω and the threshold value th1 is about 10Ω, and the resonant frequency fr0 is about 50 kHz and the threshold value th2 is about 100 kHz, when the measured impedance Z1 is equal to or more than about 110Ω and the resonant frequency fr1 is equal to or more than about 150 kHz, the condition of step S303 is satisfied and the signal processing circuit 20 determines that the foreign substance has adhered to the surface of the protection cover 2.

When the obtained difference $|Z1-Z0|$ is less than the threshold value th1, and at the same time, the obtained difference $|fr1-fr0|$ is less than the threshold value th2 (NO in step S303), the signal processing circuit 20 terminates the processing. When the obtained difference $|Z1-Z0|$ is equal to or larger than the threshold value th1, and at the same time, the obtained difference $|fr1-fr0|$ is equal to or larger than the threshold value th2 (YES in step S303), the signal processing circuit 20 determines that the foreign substance has adhered to the surface of the protection cover 2, and moves to the process of identifying the type of the adhering foreign substance.

Figure 17:
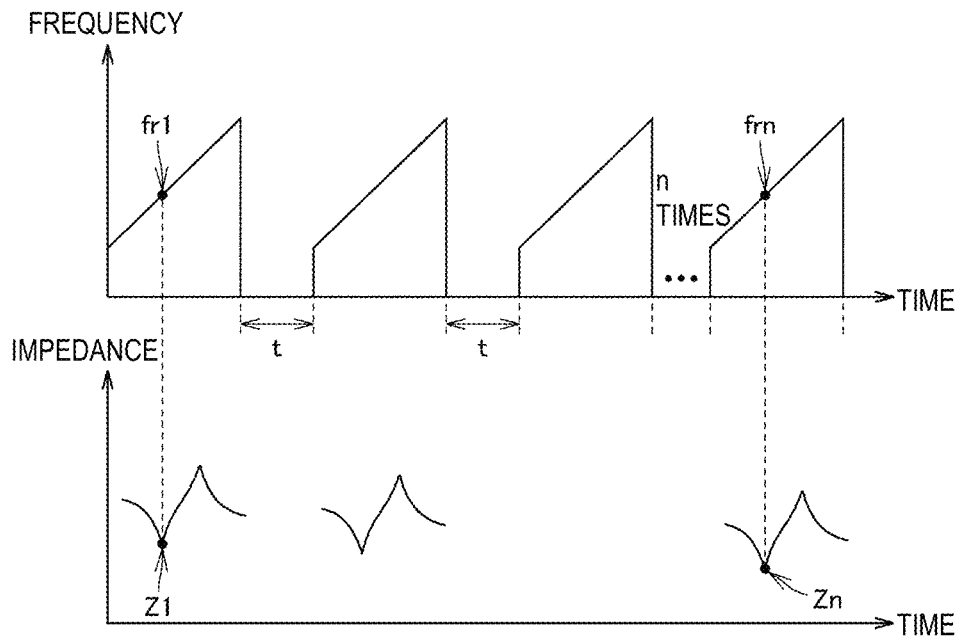
FIG. 17 is a graph showing a change in frequency and impedance when a search mode is repeatedly operated n times.

The signal processing circuit 20 repeats the search mode n times as a process of identifying the type of the foreign substance adhering to the surface of the protection cover 2, and causes the impedance detector 70 to measure the impedance Zn and the resonant frequency frn (step S304). FIG. 17 is a graph showing changes in the frequency and the impedance when the search mode is repeatedly operated n times. The impedance detector 70 measures the frequency, within the frequency range f swept at the first time, at which the current of the piezoelectric device driver 30 becomes the maximum (or impedance being the inverse of current value becomes the minimum) as the resonant frequency fr1, and measures the impedance at this time as Z1. Note that the measurement in step S301 may be made as the first measurement. After the first measurement, the second measurement is started with the interval time of the time t interposed therebetween. As described in FIG. 17, the impedance detector 70 measures the frequency, within the frequency range f swept at n-th time, at which the current of the piezoelectric device driver 30 becomes the maximum (or impedance being the inverse of current value becomes the minimum) as the resonant frequency frn, and measures the impedance at this time as Zn.

The signal processing circuit 20 calculates $\Delta Zn$ which is the change rate of the impedance Zn measured in step S304 with respect to the impedance Z0 by $\Delta Zn=Zn/Z0$, and calculates $\Delta frn$ which is the change rate of the measured resonant frequency frn with respect to the resonant frequency fr0 by $\Delta frn=frn/fr0$ (step S305).

The signal processing circuit 20 calculates the gradient of the measured impedance change rate with respect to the resonant frequency change rate to determine the type of the foreign substance adhering to the surface of the protection cover 2. The signal processing circuit 20 determines whether or not the calculated gradient $|\Delta Zn/\Delta frn-(\Delta Z1/\Delta fr1)|$ is equal to or less than the threshold value th3 (step S306). For example, as described in FIG. 16, the graph A in which only water as a foreign substance has adhered to the surface of the protection cover 2 does not change in the gradient even when the search mode is repeated n times. However, the graph B or C in which a foreign substance such as about 50% muddy water or about 100% muddy water has adhered to the surface of the protection cover 2 changes in the gradient such that the gradient thereof approaches the gradient of the graph A when the search mode is repeated n times. That is, the signal processing circuit 20 determines that the foreign substance adhering to the surface of the protection cover 2 is water when there is little or no change in the gradient after the search mode is repeated n times, and determines that the foreign substance adhering to the surface of the protection cover 2 is muddy water when there is a change in the gradient after the search mode is repeated n times.

When the determined gradient $|\Delta Zn/\Delta frn-(\Delta Z1/\Delta fr1)|$ is equal to or less than the threshold value th3 (YES in step S306), the signal processing circuit 20 determines that the foreign substance adhering to the surface of the protection cover 2 is water. The signal processing circuit 20, then, sets the drive frequency fdr to the resonant frequency and sets the drive voltage Vdr to V1 to drive the piezoelectric device driver 30 (step S307). The signal processing circuit 20 executes the drive mode A to drive the piezoelectric device driver 30 alone based on the value set in step S307 without driving the cleaning driver 60 (step S308). Then, the signal processing circuit 20 returns the processing to step S303.

When the determined gradient $|\Delta Zn/\Delta frn-(\Delta Z1/\Delta fr1)|$ is greater than the threshold value th3 (NO in step S306), the signal processing circuit 20 determines that the foreign substance adhering to the surface of the protection cover 2 is muddy water. The signal processing circuit 20, then, sets the drive frequency fdr to the resonant frequency, sets the drive voltage Vdr to V1 to drive the piezoelectric device driver 30, and activates the cleaning driver 60 (step S309). The signal processing circuit 20 causes the cleaning driver 60 to discharge the cleaning liquid, and executes the drive mode B in which the piezoelectric device driver 30 is driven based on the value set in step S309 (step S310). Then, the signal processing circuit 20 returns the processing to step S303.

Figure 18:
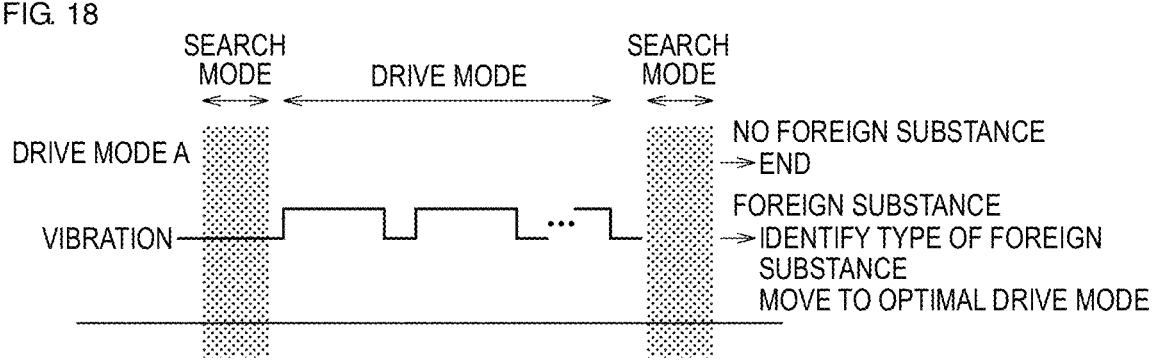
FIG. 18 is a diagram for describing an example when the cleaning device is driven in a drive mode A.

FIG. 18 is a diagram for describing an example of a driving in the drive mode A. The signal processing circuit 20 drives the piezoelectric device driver 30 alone without driving the cleaning driver 60 in the drive mode A during the drive mode upon determining that the foreign substance adhering to the surface of the protection cover 2 is water in the search mode. Note that upon being provided with the self-excited oscillation circuit, the piezoelectric device driver 30 may allow the oscillation frequency to follow the resonant frequency. The signal processing circuit 20 drives in the drive mode for a predetermined period, and then drives in the search mode again to determine the presence or absence of the foreign substance adhering to the surface of the protection cover 2. The signal processing circuit 20 terminates the processing upon determining that the foreign substance is absent, and to the contrary, the signal processing circuit 20 identifies the type of the foreign substance and moves to the optimal drive mode upon determining that the foreign substance is present. As described above, when the signal processing circuit 20 is able to determine that the foreign substance adhering to the surface of the protection cover 2 is water, it is possible to remove the water as the foreign substance by the vibration alone, and the cleaning driver 60 such as a washer need not be operated unnecessarily.

Figure 19:
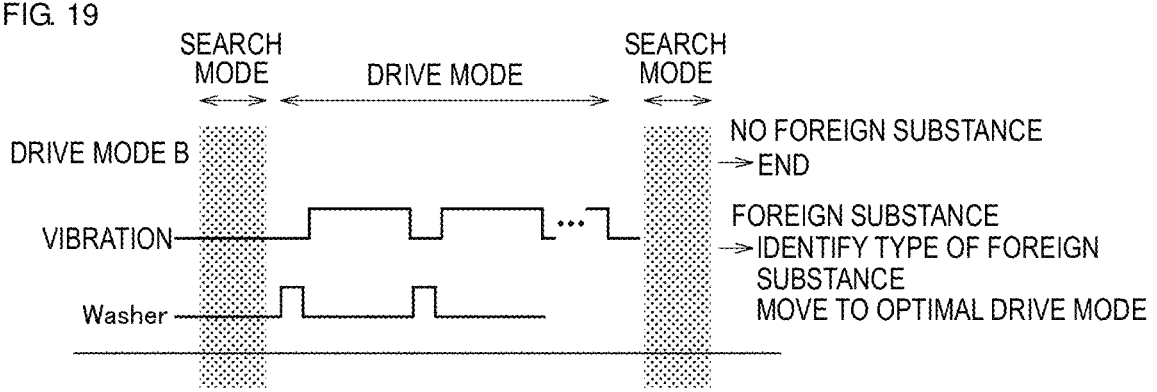
FIG. 19 is a diagram for describing an example when the cleaning device is driven in a drive mode B.

FIG. 19 is a diagram for describing an example of a driving in the drive mode B. The signal processing circuit 20 drives the cleaning driver 60 and the piezoelectric device driver 30 in the drive mode B during the drive mode upon determining that the foreign substance adhering to the surface of the protection cover 2 is muddy water in the search mode. Specifically, the signal processing circuit 20 causes the cleaning driver 60 to discharge the cleaning liquid onto the protection cover 2 to wash off the contamination, and then causes the piezoelectric device driver 30 to atomize the remaining water droplet. Atomizing the foreign substance first by the piezoelectric device driver 30 causes the moisture alone in the muddy water to be atomized when the foreign substance is muddy water, for example. This causes the solidified mud component to remain on the surface of the protection cover 2 and the solidified mud component is less likely to be washed off even by the discharging of the cleaning liquid. For this reason, the signal processing circuit 20 causes the cleaning driver 60 to discharge the cleaning liquid onto the protection cover 2 to wash off the contamination before causing the piezoelectric device driver 30 to atomize the foreign substance. Further, the signal processing circuit 20 causes the piezoelectric device driver 30 to apply a vibration to the protection cover 2 to an extent that the foreign substance is not atomized while the cleaning driver 60 is cleaning with the cleaning liquid. This has an effect that the contamination adhering to the protection cover 2 floats up because of an ultrasonic cleaning effect and becomes easy to be washed off. As described above, the combination of the cleaning by the cleaning driver 60 and the vibration by the piezoelectric device driver 30 in the cleaning device for the imaging unit makes it possible to effectively remove the foreign substance adhering to the surface of the protection cover 2.

In the above-described example, a description has been provided in which the signal processing circuit 20 is able to determine whether the foreign substance adhering to the surface of the protection cover 2 is water or muddy water by setting the threshold value th3 to the gradient of the impedance change rate with respect to the resonant frequency change rate. However, not limited to that, the signal processing circuit 20 is able to determine the foreign substance adhering to the surface of the protection cover 2 other than water or muddy water by appropriately setting the threshold value th3, upon finding the change trend of the gradient of the impedance change rate with respect to the resonant frequency change rate in accordance with the type of the foreign substance adhering to the surface of the protection cover 2. In addition, the signal processing circuit 20 may determine whether about 50% muddy water or about 200% muddy water, which both are muddy water, is adhered to the surface of the protection cover 2 by appropriately setting the threshold value th3. The signal processing circuit 20 is able to select an optimal cleaning method and efficiently remove the foreign substance by determining the type of the foreign substance adhering to the surface of the protection cover 2.

As described above, in the cleaning device according to Preferred Embodiment 4, the signal processing circuit 20 identifies the type of the foreign substance adhering to the surface of the protection cover 2 based on the gradient of the temporal change in impedance detected by the impedance detector 70 with respect to the temporal change in the resonant frequency. As a result, in the cleaning device according to Preferred Embodiment 4, the signal processing circuit 20 may select an optimum cleaning method. The signal processing circuit 20 may store the change trend of the gradient of temporal change in the impedance detected by the impedance detector 70 with respect to the temporal change in the resonant frequency in accordance with the type of the foreign substance adhering to the surface of the protection cover 2. This makes it possible for the signal processing circuit 20 to determine the type of the foreign substance other than water and muddy water.

The cleaning device according to Preferred Embodiment 4 may appropriately combine the configurations described in the cleaning device according to above-described Preferred Embodiment 1. For example, in the cleaning device according to Preferred Embodiment 4, the vibration mode to drive the vibration portion 12 to determine that the foreign substance has adhered to the surface of the protection cover 2 and the vibration mode to drive the vibration portion 12 to clean the surface of the protection cover 2 may be different from each other. The signal processing circuit 20 may change the voltage to drive the vibration portion 12 to clean the surface of the protection cover 2 based on at least one value of the resonant frequency and the impedance. The signal processing circuit 20 may set the voltage to drive the vibration portion 12 equal to or more than the first voltage (V1) and equal to or less than the second voltage (V2) when the cleaning liquid discharger 50 discharges the cleaning liquid to clean the surface of the protection cover 2.

Further, the cleaning liquid discharger 50 may discharge a first cleaning liquid to clean the surface of the protection cover 2 and a second cleaning liquid having a more intense cleaning power than the first cleaning liquid. The signal processing circuit 20 may switch between the first cleaning liquid and the second cleaning liquid based on at least one piece of information among the resonant frequency when the vibration portion 12 is driven at the first voltage, the value relating to the impedance (current value) detected by the impedance detector 70, and the image captured by the imaging portion 5.

In addition, the configuration described in the cleaning device according to above-described Preferred Embodiment 2 may be appropriately combined with the cleaning device according to Preferred Embodiment 4. For example, in the cleaning device according to Preferred Embodiment 4, the signal processing circuit 20 may include the first period (time t1) to drive at the frequency in the vicinity of the resonant frequency and the second period (time t2) to drive at the frequency other than in the vicinity of the resonant frequency for the driving of the vibration portion 12 to clean the surface of the protection cover 2, and may determine the duty ratio of the first period and the second period based on at least one piece of information among the resonant frequency when the vibration portion 12 is driven at the first voltage, the value relating to the impedance (current value) detected by the impedance detector 70, and the image captured by the imaging portion 5.

In addition, the configuration described in the cleaning device according to above-described Preferred Embodiment 3 may be appropriately combined with the cleaning device according to Preferred Embodiment 4. For example, in the cleaning device according to Preferred Embodiment 4, the signal processing circuit 20 may estimate the temperature of the protection cover 2 based on the change amount of the resonant frequency ($\Delta f$) when the vibration portion 12 is driven at the first voltage (V1) and the change amount of the current value ($\Delta I$) relating to the impedance detected by the impedance detector 70, and may change the voltage to drive the vibration portion 12 based on the estimated temperature of the protection cover 2 when cleaning the surface of the protection cover 2. Further, the cleaning device according to Preferred Embodiment 4 may further include the temperature measurement device 90 described in above-described Preferred Embodiment 3 for measuring the temperature of the vibration portion 12 or the protection cover 2, and the signal processing circuit 20 may change the voltage to drive the vibration portion 12 when cleaning the surface of the protection cover 2 based on the measurement result of the temperature measurement unit 90.

In the imaging units according to the above-described preferred embodiments, the configuration of the imaging portion 5 is not described in detail, but the imaging portion 5 may include, for example, a camera, a LiDAR, or a Radar.

In the cleaning devices according to the above-described preferred embodiments, the description has been provided that the signal processing circuit 20 determines that the foreign substance has adhered to the surface of the protection cover 2 based on at least two pieces of information among the change amount of the resonant frequency ($\Delta f$), the change amount in the current value ($\Delta I$), and the temporal change in the image (brightness integral value). However, when the cleaning device further includes the temperature measurement device 90, the signal processing circuit 20 may determine that the foreign substance has adhered to the surface of the protection cover 2 based on at least two pieces of information among the change amount of the resonant frequency ($\Delta f$), the change amount of the current value ($\Delta I$), the temporal change in the image (brightness integral value), and the temperature measured by the temperature measurement device 90.

In the cleaning devices for the imaging unit according to the above-described preferred embodiments, the search mode for determining the presence or absence and the degree of the foreign substance adhering to the surface of the protection cover 2 and the drive mode for removing the foreign substance adhering to the surface of the protection cover 2 are separately driven. However, not limited to that, the cleaning device may drive the search mode constantly or intermittently at a predetermined cycle, where the search mode is driven for determining the presence or absence and the degree of the foreign substance adhering to the surface of the protection cover 2.

In the cleaning devices for the imaging unit according to the above-described preferred embodiments, the cleaning by vibrating the protection cover 2 and the cleaning by discharging the cleaning liquid by the cleaning liquid discharger 50 have been exemplified, but the present invention is not limited thereto. For example, the foreign substance adhering to the surface of the protection cover 2 may be removed by cleaning in which the cleaning liquid discharger 50 discharges air.

In the imaging units according to the above-described preferred embodiments, the description has been provided of the configuration in which the one cleaning nozzle 3 is provided in the housing 1 as illustrated in FIG. 1, but the imaging units are not limited thereto, and the configuration in which a plurality of cleaning nozzles 3 are provided in the housing 1 may be provided.

The imaging units according to the above-described preferred embodiments is not limited to the imaging units provided on the vehicle, and the present invention may similarly be applied to an imaging unit for an application in which a light-transmissive body disposed in the field of view of an imaging element needs to be cleaned.

In the imaging units according to the above-described preferred embodiments, the description has been provided in which the temporal change in the image captured by the imaging portion 5 is one of the information to determine that the foreign substance has adhered to the surface of the protection cover 2, and the temporal change of the brightness integral value of the image captured by the imaging portion 5 is an example thereof. However, not limited to that, as the temporal change in the image captured by the imaging portion 5, the temporal change in a frequency spectrum may be used to determine that the foreign substance has adhered to the surface of the protection cover 2, for example. Here, the frequency spectrum generated by the image processing evaluates the blur of an edge of the captured image.

Specifically, when a raindrop has adhered to the surface of the protection cover 2 as the foreign substance, the image captured by the imaging portion 5 is blurred at the edge of the image as compared with the case where the raindrop has not adhered, and the frequency power of the frequency spectrum increases in the lower frequency range as compared with the case where the image is not blurred. Therefore, the signal processing circuit 20 may determine that a raindrop has adhered to the surface of the protection cover 2 as the foreign substance when the frequency with the large frequency power shifts to the lower frequency range in the frequency spectrum. The signal processing circuit 20 may determine that the foreign substance has adhered to the surface of the protection cover 2 with higher accuracy combining the temporal change of the frequency spectrum.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning device comprising:
   a holding portion to hold an imaging element;
   a light-transmissive body disposed in a field of view of the imaging element;
   a vibrator to vibrate the light-transmissive body;
   a driver to drive the vibrator;
   a controller to control the driver; and
   a detector to detect a value relating to an impedance of the vibrator driven by the driver; wherein
   the controller is configured to receive an imaging signal from the imaging element;
   the controller determines that a foreign substance has adhered to a surface of the light-transmissive body based on at least two pieces of information among a temporal change in a resonant frequency when the vibrator is driven at a first voltage, a temporal change in a value relating to the impedance detected by the detector, and a temporal change in an image captured by the imaging element, and cleans the surface of the light-transmissive body by controlling the vibrator in accordance with the determination of the controller; and
   the controller is configured to identify a type of the foreign substance adhering to the surface of the light-transmissive body based on a gradient of the temporal change in the value relating to the impedance detected by the detector with respect to the temporal change in a resonant frequency.

2. The cleaning device according to claim 1, wherein the controller is configured to determine a drive frequency to drive the vibrator to clean the surface of the light-transmissive body and to drive the vibrator at the drive frequency and a second voltage upon determining that a foreign substance has adhered to the surface of the light-transmissive body.

3. The cleaning device according to claim 1, wherein the controller is configured to determine that a foreign substance has adhered to the surface of the light-transmissive body in a case in which the temporal change in the resonant frequency when the vibrator is driven at the first voltage is negative and the temporal change in the value relating to the impedance detected by the detector is positive.

4. The cleaning device according to claim 1, wherein the controller is configured to determine that a foreign substance has adhered to the surface of the light-transmissive body in a case where the temporal change in the resonant frequency when the vibrator is driven at the first voltage is negative and a temporal change in brightness obtained from the image captured by the imaging element is negative.

5. The cleaning device according to claim 1, wherein the controller is configured to determine that a foreign substance has adhered to the surface of the light-transmissive body when the temporal change in the value relating to the impedance detected by the detector is positive and a temporal change in brightness obtained from the image captured by the imaging element is negative.

6. The cleaning device according to claim 1, wherein the controller is configured to identify the type of the foreign substance adhering to the surface of the light-transmissive body based on an analysis result of the image captured by the imaging element.

7. The cleaning device according to claim 1, wherein the controller is configured to store a change trend of the gradient of the temporal change in the value relating to the impedance detected by the detector with respect to the temporal change in the resonant frequency in accordance with the type of the foreign substance adhering to the surface of the light-transmissive body.

8. The cleaning device according to claim 1, wherein the controller is configured to drive the vibrator in a plurality of vibration modes, and a vibration mode to drive the vibrator to determine that a foreign substance has adhered to the surface of the light-transmissive body and a vibration mode to drive the vibrator to clean the surface of the light-transmissive body are different from each other.

9. The cleaning device according to claim 1, wherein the controller is configured to change a voltage to drive the vibrator to clean the surface of the light-transmissive body based on at least one value of the resonant frequency and the impedance.

10. The cleaning device according to claim 1, further comprising:
    a discharger to discharge a cleaning body onto the surface of the light-transmissive body; wherein
    the controller is configured to cause the discharger to discharge the cleaning body in accordance with the determination that a foreign substance has adhered to the surface of the light-transmissive body.

11. The cleaning device according to claim 10, wherein the controller is configured to set a voltage to drive the vibrator to equal to or higher than the first voltage and equal to or lower than the second voltage when the surface of the light-transmissive body is cleaned by the discharger discharging the cleaning body.

12. The cleaning device according to claim 10, wherein
    the discharger is configured to discharge a first cleaning body to clean the surface of the light-transmissive body and a second cleaning body having a more intense cleaning power than the first cleaning body; and
    the controller is configured to switch between the first cleaning body and the second cleaning body based on at least one piece of information among the resonant frequency when the vibrator is driven at the first voltage, the value relating to the impedance detected by the detector, and the image captured by the imaging element.

13. The cleaning device according to claim 1, wherein the controller is configured to operate to include:
    a first period to drive in a vicinity of a resonant frequency and a second period to drive in a frequency other than the vicinity of the resonant frequency for the driving of the vibrator to clean the surface of the light-transmissive body; and
    determines a duty ratio of the first period and the second period based on at least one piece of information among the resonant frequency when the vibrator is driven at the first voltage, the value relating to the impedance detected by the detector, and the image captured by the imaging element.

14. The cleaning device according to claim 1, wherein the controller is configured to:
    estimate a temperature of the light-transmissive body based on the temporal change in the resonant frequency when the vibrator is driven at the first voltage and the temporal change in the value relating to the impedance detected by the detector; and
    change a voltage to drive the vibrator to clean the surface of the light-transmissive body based on the estimated temperature of the light-transmissive body.

15. The cleaning device according to claim 1, further comprising:
    a temperature sensor to measure a temperature of the vibrator or the light-transmissive body; wherein the controller is configured to change a voltage to drive the vibrator to clean the surface of the light-transmissive body based on the measured temperature of the temperature sensor.

16. An imaging unit, comprising:
an imaging element; and
the cleaning device according to claim 1.

17. A cleaning method for cleaning a surface of a light-transmissive body by using a cleaning device including a holding portion to hold an imaging element, a light-transmissive body disposed in a field of view of the imaging element, a vibrator to vibrate the light-transmissive body, a driver to drive the vibrator, a controller to control the driver, and a detector to detect a value relating to an impedance of the vibrator driven by the driver, the cleaning method comprising steps of:

driving the vibrator at a first voltage as a search mode;
determining that a foreign substance has adhered to a surface of the light-transmissive body based on at least two pieces of information among a temporal change in a resonant frequency, a temporal change in a value relating to an impedance detected by the detector, and a temporal change in an image captured by the imaging element in the search mode;
determining a drive frequency to drive the vibrator in accordance with the determination that a foreign substance has adhered to the surface of the light-transmissive body; and
driving the vibrator at the determined drive frequency and a second voltage as a drive mode; wherein
the controller is configured to receive an imaging signal from the imaging element; and
the controller is configured to identify a type of the foreign substance adhering to the surface of the light-transmissive body based on a gradient of the temporal change in the value relating to the impedance detected by the detector with respect to the temporal change in a resonant frequency.

* * * * *